(12) United States Patent
Ahmad et al.

(10) Patent No.: US 6,172,675 B1
(45) Date of Patent: Jan. 9, 2001

(54) INDIRECT MANIPULATION OF DATA USING TEMPORALLY RELATED DATA, WITH PARTICULAR APPLICATION TO MANIPULATION OF AUDIO OR AUDIOVISUAL DATA

(75) Inventors: Subutai Ahmad, Palo Alto, CA (US); Emanuel E. Farber, New York, NY (US)

(73) Assignee: Interval Research Corporation, Palo Alto, CA (US)

( * ) Notice: Under 35 U.S.C. 154(b), the term of this patent shall be extended for 0 days.

(21) Appl. No.: 08/761,025

(22) Filed: Dec. 5, 1996

(51) Int. Cl.[7] .................................................. G06F 13/00
(52) U.S. Cl. ...................... 345/328; 345/302; 345/382; 704/255; 707/100; 707/104; 707/530
(58) Field of Search ..................... 707/100, 101, 707/530, 104, 531; 364/481; 395/615; 704/255; 345/302, 382, 328

(56) References Cited

U.S. PATENT DOCUMENTS

| | | | |
|---|---|---|---|
| 4,574,354 | * 3/1986 | Mihalik et al. | 364/481 |
| 5,317,730 | * 5/1994 | Moor et al. | 395/600 |
| 5,384,703 | 1/1995 | Withgott et al. | 364/419.19 |
| 5,467,288 | * 11/1995 | Fasciano et al. | 345/328 |
| 5,664,227 | * 9/1997 | Mauldin et al. | 345/302 |
| 5,729,741 | * 3/1998 | Liaguno et al. | 707/104 |
| 5,765,133 | * 6/1998 | Antoniol et al. | 704/255 |

FOREIGN PATENT DOCUMENTS

| | | |
|---|---|---|
| 0295148 | 12/1988 | (EP) . |
| WO 96/12240 | 4/1996 | (WO) . |

OTHER PUBLICATIONS

Alexander G. Hauptman, Michael J. Witbrock, Alexander I. Rudnicky and Stephen Reed, "Speech for Multimedia Information Retrieval", UIST '95 (ACM), Nov. 14, 1995, pp. 79–80.

(List continued on next page.)

*Primary Examiner*—Mark Zimmerman
*Assistant Examiner*—Kimbinh T. Nguyen
(74) *Attorney, Agent, or Firm*—David R. Graham

(57) ABSTRACT

The invention enables a body of information to be easily manipulated (e.g., summarized, rearranged, edited, selectively accessed or searched) to facilitate use of the information by a user. The body of information is represented by at least two sets of temporally related data. Manipulation of a second one of the sets of data in a predetermined manner is accomplished indirectly through direct manipulation of a first one of the sets of data in the predetermined manner. Where the body of information is represented by more than two sets of temporally related data, the additional sets of data can also be manipulated in a similar fashion. In a particular embodiment of the invention, digital text data representing a body of information (which is also represented by video and/or audio data) is manipulated, the digital text data is aligned with either the digital video data or digital audio data of the body of information, and the digital video data or digital audio data is manipulated according to the manipulation of the digital text data and the alignment of the digital text data with the digital video data or digital audio data. The other of the video or audio data (if present) can be manipulated by aligning that data with either the text data or the previously manipulated video or audio data, then manipulating the other of the video or audio data according to the previous manipulation of the data with which the other of the video or audio data has been aligned.

73 Claims, 16 Drawing Sheets

OTHER PUBLICATIONS

"Correlating Audio and Moving–Image Tracks", IBM Technical Disclosure Bulletin, vol. 33, No. 10A, Mar. 1991, pp. 295–296.

Robert R. Turner, "1,001 Questions to Ask Before Deciding On a Nonlinear Video Editing System", SMPTE Journal, vol. 103, No. 3, Mar. 1994, pp. 160–173.

Yaginuma Y., Izumi N., Sakauchi M., "A proposal of a video editing method using synchronized scenario document", Trans. Inst. Electron. Inf. Commun. Eng., vol. J79D–II, No. 4, Japan, Apr. 1996, Abstract.

* cited by examiner

| FIG. 7C-1 | FIG. 7C-2 |

INDIRECT MANIPULATION OF DATA USING TEMPORALLY RELATED DATA, WITH PARTICULAR APPLICATION TO MANIPULATION OF AUDIO OR AUDIOVISUAL DATA

BACKGROUND OF THE INVENTION

This invention is related to the manipulation of a body of information represented by sets of chronologically ordered data and, in particular, to the indirect manipulation of a secondary set or sets of data through manipulation of a primary set or sets of data that is/are temporally related to the secondary set or sets of data and whose elements can be aligned with those of the secondary set or sets of data. Most particularly, the invention is related to the indirect manipulation of audio or audio-visual data using text data that can be related to the audio or audio-visual data.

It is desirable to be able to manipulate a body of information in a variety of ways—such as summarizing, rearranging, editing, selectively accessing or searching the body of information—to facilitate digestion of the content of the body of information by users. For example, the body of information could be a videotape of a temporal event (i.e., an action or actions that occur over a period of time). It is useful to be able to summarize the content of the videotape (particularly if it is long), access content occurring at a particular time in the videotape, search for particular content in the videotape, or rearrange or otherwise edit the content of the videotape.

A body of information is typically represented as a set or sets of data. The data can be in different forms (e.g., digital or analog) and of different types (e.g., audio, video, text). A body of information can oftentimes be represented in different ways by related sets of data of different forms and/or types. For example, a temporal event can be represented by a videotape having analog data, digital data, or both. Additionally, the videotape can include video data, audio data and text data, each type of data describing actions that occur at particular times during the event.

Enabling a particular body of information to be easily manipulated in a manner that suits the ends of particular users can be problematic. The recent explosive growth in the amount of information that is available digitally provides an illustration of the problem: trying to get just an overview of a large body of digital information can be overwhelming, and attempting to find specific material within the body of information can be like searching for a needle in a haystack. Thus, there is a need generally for methods and systems for enabling bodies of information—and, in particular, bodies of digital information—to be easily and flexibly manipulated.

SUMMARY OF THE INVENTION

The invention enables a body of information to be manipulated (e.g., summarized, rearranged, edited, selectively accessed or searched) so that a user can digest the content of the body of the information more easily and can access the information more readily. The body of information is represented by at least two sets of temporally related data. Manipulation of a second one of the sets of data in a predetermined manner is accomplished indirectly through direct manipulation of a first one of the sets of data in the predetermined manner. The direct manipulation of the first set of data produces a manipulated first set of data which can include some or all of the first set of data, but does not include the entire first set of data in the same order which existed originally. The first and second sets of data are aligned to establish a temporal correspondence between the data of the two sets. Data from the second set of data that corresponds (based on the alignment) to data from the manipulated first set of data is manipulated to produce the manipulated second set of data, such that the same temporal correspondences that exist between the data of the first and second sets of data also exist between data of the manipulated first and second sets of data.

The invention takes advantage of the fact that some forms or types of data more readily lend themselves to particular manipulations and operations than other forms or types of data. For example, digital text data is well-suited to syntactic and semantic analysis in general and to word-based manipulation in particular. Such manipulations can advantageously be used to manipulate a body of information that can be represented by digital text data. In one embodiment of the invention, digital text data of a body of information is manipulated (e.g., summarized), the digital text data is aligned with either digital video data or digital audio data of the body of information, and the digital video data or digital audio data is manipulated according to the manipulation of the digital text data and the alignment of the digital text data with the digital video data or digital audio data. Such an embodiment is useful in, for example, manipulating a videotape or audiotape that includes an associated text transcript. It is also, for example, often easier to manipulate digital data than it is to manipulate analog data. Thus, the invention usually converts analog data (e.g., analog video data) to digital data (e.g., digital video data) prior to manipulation of any of the data. Generally, the invention manipulates a set of data that is in a form or of a type that is relatively difficult to manipulate, or that cannot be manipulated in a certain fashion, by manipulating a related set of data that is in a form and of a type that is relatively easy to manipulate.

Where the body of information includes more than two sets of temporally related data, the additional sets of data can also be manipulated in accordance with the invention. If alignment exists between two sets of data, an additional data set can be aligned with either one, yielding mutual alignment among the three sets. In general, an additional set of data can be aligned with any set of data that has already been aligned with another set of data that either has previously been manipulated or that has been aligned with a previously manipulated set of data. A manipulation of the additional data set is produced from data in the additional data set that corresponds (based on the alignment) to data in a previously manipulated data set. For example, where either video data or audio data has been manipulated indirectly by directly manipulating text data, as described above, the other of the video or audio data can be manipulated by aligning that data with either the text data or the one of the video or audio data that has been previously manipulated, then manipulating the other of the video or audio data according to the previous manipulation of the data with which the other of the video or audio data has been aligned. As an even more specific example, a body of information, such as a videotape, that includes a set of video data, a set of audio data and a set of text data can be manipulated by manipulating the text data, aligning the text data with the audio data and then manipulating the audio data, then using alignment of the audio and video data to manipulate the video data.

As indicated above, the invention enables a body of information to be manipulated in any desired manner. For example, the invention can be used to summarize the body of information, quickly giving an overview of the content of the entire body of information or a defined portion. The invention can also be used to rapidly access a particular portion or portions of the body of information, enabling rapid retrieval of specific information of interest. Further, the invention can be used to search for particular information within the body of information. Additionally, the invention can be used to edit the body of information (e.g., rearrange or delete portions of the body of information) in any desired manner to achieve any of a number of purposes, such as creation of a video collage or implementation of an information filter.

BRIEF DESCRIPTION OF THE DRAWINGS

FIG. 4A illustrates sets of temporally related unsummarized video, audio and text data. FIG. 4B illustrates summarization of the text data. FIG. 4C illustrates alignment of the text and audio data. FIG. 4D illustrates how the text summarization illustrated in FIG. 4B and the alignment illustrated in FIG. 4C are used to produce a summarized set of audio data. FIG. 4E illustrates how the summarized audio data can be used to produce a video data summary.

FIG. 6A depicts a general finite state machine for accomplishing the finite state process. FIG. 6B illustrates a "trellis" showing possible transition sequences when the finite state process is run for a fixed number of iterations.

DETAILED DESCRIPTION OF EMBODIMENTS OF THE INVENTION

Figure 1A:
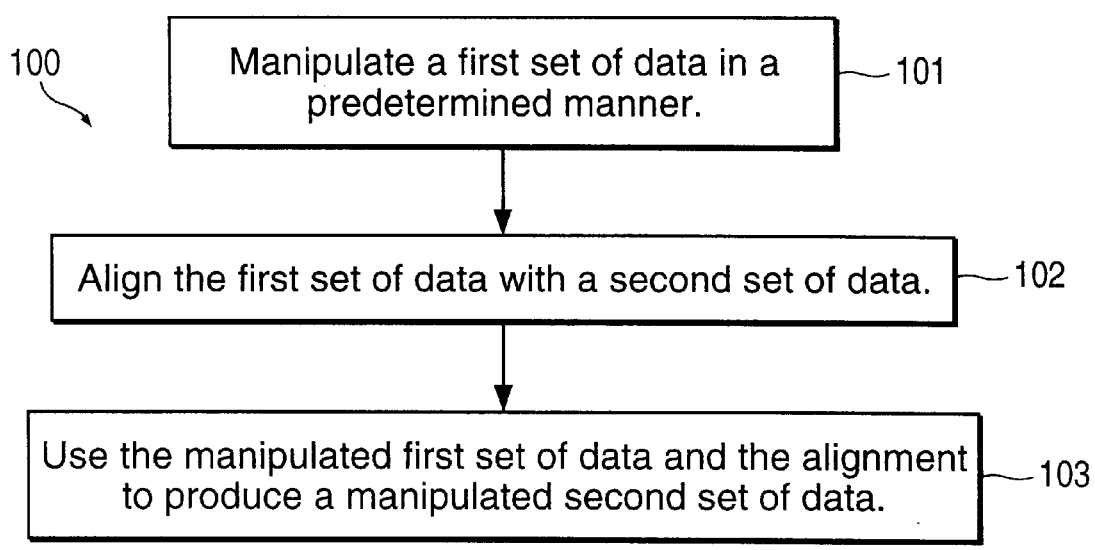
FIG. 1A is a flow chart of a method, according to an embodiment of the invention, for indirectly manipulating a set of data representing a body of information.
Figure 2:
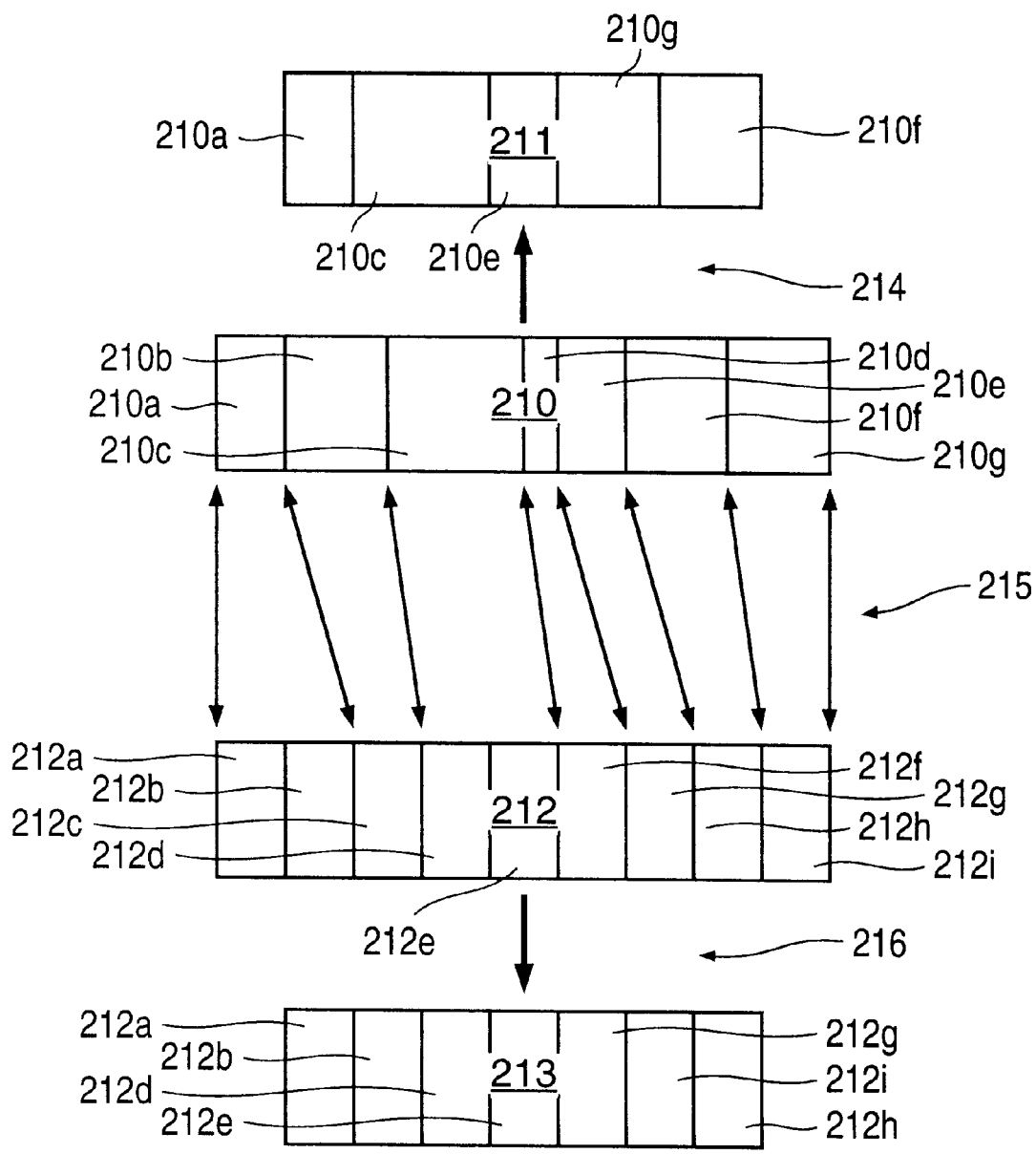
FIG. 2 is a diagram illustrating exemplary data transformations that can occur during the methods of FIGS. 1A and 1B.

FIG. 1A is a flow chart of a method 100, according to an embodiment of the invention, for indirectly manipulating a set of data representing a body of information. FIG. 2 is a diagram illustrating exemplary data transformations that can occur during the method 100. Herein, "manipulation" refers to any changing of a set of data from an original constitution of the set of data and can include, for example, extracting a subset of the set of data based upon one or more specified criteria (e.g., summarizing the set of data), selectively accessing the set of data according to a specified direction, searching the set of data for particular information, or rearranging or otherwise editing the set of data according to one or more specified criteria or rules. The set of data (designated as the "second set of data" below) is temporally related to a first set of data that also represents the body of information. Herein, "temporally related" means that the sets of data span roughly the same period of time and that the data within each set is arranged chronologically.

In step 101 of the method 100 (FIG. 1A), a first set of data 210, including data portions 210a through 210g, is manipulated (as represented in FIG. 2 by the arrow designated by the numeral 214) in a predetermined manner to produce a manipulated first set of data 211, as shown in FIG. 2. The manipulation 214 produces a manipulated first data set 211 that can include some or all of the data portions 210a through 210g of the first data set 210, but does not include the entire first data set 210 in the order which existed originally. As shown in FIG. 2, the manipulated first data set 211 includes only the data portions 210a, 210c, 210e, 210f and 210g from the first data set 210. Further, the order of the data portions 210f and 210g has been reversed.

As will be better appreciated from the description of FIG. 4A below, the division of a particular data set into data portions can be based on the type of the data as well as the content of the data, so that, generally, different sets of data can be divided into data portions in different ways. Consequently, related data sets must be aligned to establish a temporal correspondence between the data sets so that proper correspondence between the data sets can be maintained after one of the data sets has been manipulated. In step 102 of the method 100 (FIG. 1A), the (unmanipulated) first data set 210 is aligned (as represented in FIG. 2 by the arrows designated generally by the numeral 215) with a second set of data 212, including data portions 212a through 212i, to establish a temporal correspondence between the first data set 210 and the second data set 212. (Steps 101 and 102 of the method 100 can be performed in either order, or in parallel.) The arrows of the alignment 215 extend between points within the first data set 210 and second data set 212 that occur at the same time or approximately the same time.

In step 103, data from the second set of data 212 that corresponds (based on the alignment) to data from the manipulated first set of data 211 is manipulated (as represented in FIG. 2 by the arrows designated generally by the numeral 216) to produce the manipulated second set of data 213. As can be appreciated from FIG. 2, the same temporal correspondences which exist between the unmanipulated sets of data 210 and 212 also exist between the manipulated sets of data 211 and 213. For example, the data portions 212h and 212i of the second data set 212 have, in the manipulated second data set 213, been rearranged in order so that their correspondence to the data portions 210f and 210g in the manipulated first data set 210 is maintained.

Thus, according to the invention, a manipulation that can more easily, or only, be performed on a first set of data representing a body of information, can be transferred to a second set of data which represents the same body of information and is temporally related to the first set. Typically, the manipulated second set of data (and, perhaps, the manipulated first set of data) is subjected to further processing, stored and/or presented (e.g., displayed) in some fashion appropriate to that type of data (e.g., audio/video playback).

The indirect manipulation of a set of data by the invention depends upon alignment of the directly manipulated data set with the set of data desired to be (indirectly) manipulated. Alignment is the link that enables manipulation of one set of data to cause an appropriate manipulation of corresponding data in another (aligned) set of data. Herein, "alignment" refers to the establishment of a temporal correspondence between sets of data, i.e., the matching of data from each set according to the point or duration in time at which the data occurred. Ideally, alignment matches data from each set of data with data from other sets of data that occurred at exactly the same time. In practice, for a variety of reasons, such matching is only approximated.

Typically, the process of manipulating the first set of data (e.g., the step 101 of the method 100 described above, or the text summarization step 302 of the method 300 of FIG. 3, described below) can be accomplished quickly relative to the alignment of the first and second sets of data (e.g., the step 102 of the method 100 described above, or the alignment step 303 of the method 300, described below). Thus, if it is desired to manipulate a body of information in more than one manner, it is desirable to store the alignment information (e.g., in a computer such as the computer 801 of the system 800 described below with respect to FIG. 8), so that a subsequent manipulation can be accomplished quickly by appropriately manipulating the first set of data and using the stored alignment information to produce the manipulated second set of data (i.e., without repeating step 102 or step 303).

If a set of data is available in only analog format, then that set of data may need to be digitized by a device (e.g. audio/video digitizer, or image scanner that can have optical character recognition processing) appropriate to the medium. If the digital manipulation of a data set does not depend on the raw content of the data, then digitization of the raw data may not be necessary (provided that it is not needed to establish an alignment). If, for example, the invention is used to indirectly edit the video data of a videotape, then the video data can be manipulated by selecting and ordering particular video frames (wherein the video frames themselves need not be digitized, e.g., if the video frames are framewise accessible from the videotape) in a manner that corresponds to the manipulation of a set of a data to which the video data corresponds.

In one example of use of the method 100, the first set of data is audio data (such as the audio portion of a videotape) and the second set of data is video data (such as the video portion of the videotape). The audio is digitized, if it is not already in digital form. If the video is not digitized, then it can be represented as a sequence of frame numbers. Alignment can then be established based on the fixed length of audio samples and video frames. The audio data can be manipulated in a desired fashion. The manipulated video data is the subset of the video data corresponding (based on the alignment) to the manipulated audio data.

In another example of use of the method 100, the first and second sets of data could be text data (such as the text transcript of a videotape or audiotape) and audio data (such as the audio portion of the videotape or audiotape). The text transcript could exist as part of the original videotape or audiotape or the text transcript could be obtained from the audio portion using speech recognition techniques. The data is digitized as necessary. The digital text data can be manipulated as desired, the text and audio data aligned, and the audio data that is aligned with the manipulated text data selected as the manipulated audio data.

Figure 1B:
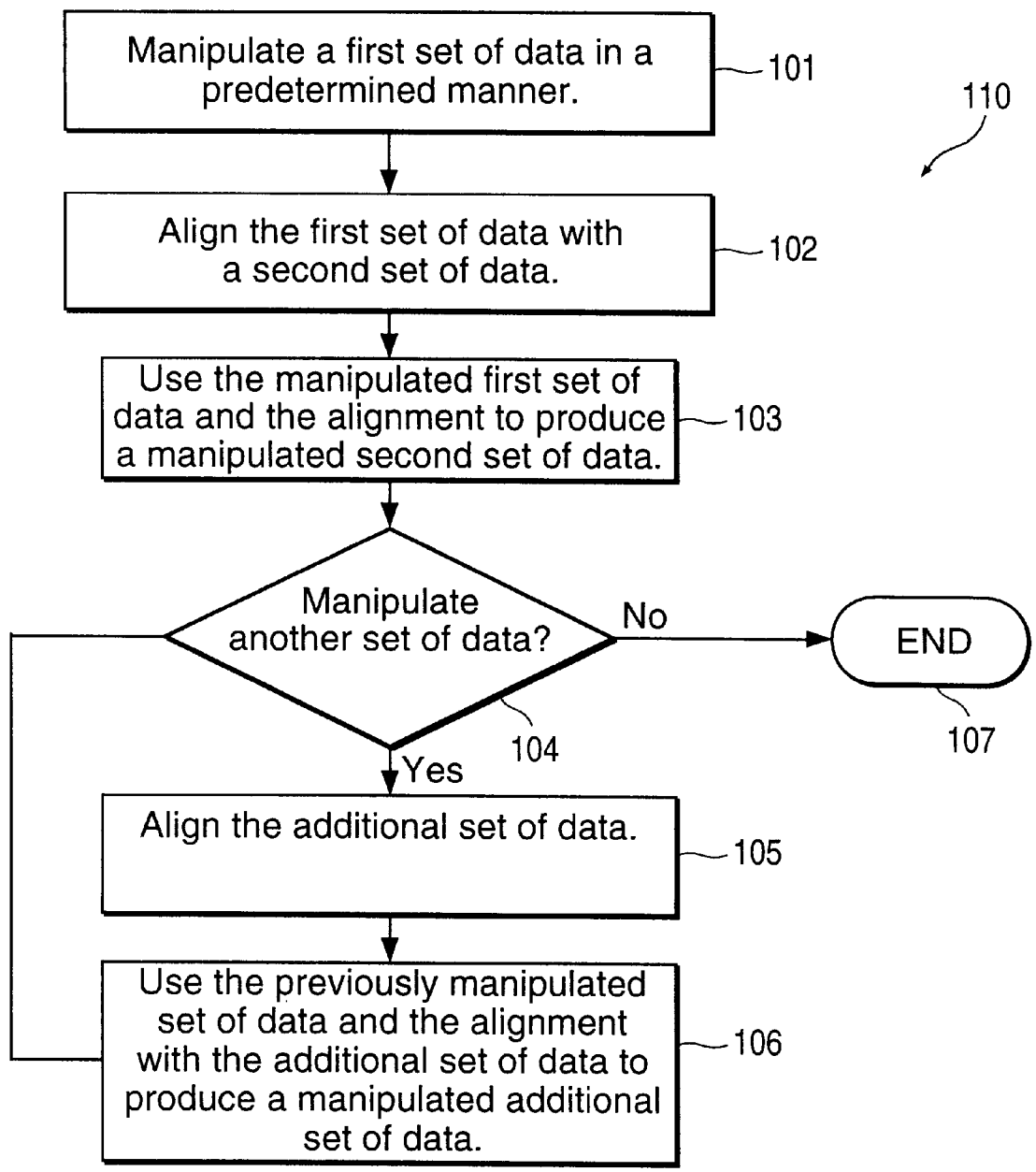
FIG. 1B is a flow chart of a method, according to another embodiment of the invention, for indirectly manipulating multiple sets of data representing a body of information.

Sometimes a body of information is represented by more than two sets of temporally related data and it is desirable to manipulate more than one of the sets of data using another set of data that is more easily manipulated than the sets of data which it is desired to manipulate. With appropriate modification, the method 100 of FIG. 1A can be used to accomplish this. FIG. 1B is a flow chart of a method 110, according to another embodiment of the invention, for indirectly manipulating multiple sets of data representing a body of information. Steps in the method 110 that are the same as that as of the method 100 are designated by the same numerals and are not described below.

In the method 110, after the second set of data is manipulated in step 103, in step 104, a determination is made as to whether there is an additional set of data to manipulate. If so, then, in step 105, the additional set of data is aligned, either with a previously manipulated set of data or with any set of data that has been previously aligned, either directly or indirectly, with a previously manipulated set of data. The alignment establishes a temporal correspondence between the additional set of data and the previously aligned set of data. In step 106, data from the additional set of data that corresponds (based on the alignment) to data from a previously manipulated set of data is manipulated to produce a manipulated additional set of data. (Note that, when multiple sets of data are being manipulated in accordance with the invention, the sets may need to be aligned in a particular order. For example, if it is only possible to align a particular set of data with one other set of data, then that set of data must be aligned first.) The method 110 ends, as shown by block 107, when there are no additional sets of data to manipulate.

In one example of use of the method 110, first, second and third sets of related data could be text data, audio data and video data (e.g., a text transcript, audio portion and video portion of a videotape), respectively. Again, the text transcript could be pre-existing or could be obtained from the audio portion. The text data and audio data can be aligned, and the audio data and video data can be aligned. The text data can be manipulated as desired and used, along with the alignment of the text data and audio data to produce manipulated audio data. The alignment of the audio and video data can then be used, with the manipulated audio data, to produce a manipulated set of video data.

Generally, the invention can be used to manipulate a set of data in any desired fashion to display or store a specified subset of the set of data or arrangement of the data in a particular order. For example, the invention can be used to quickly give an overview of the content of a set of data, rapidly access and retrieve a particular portion or portions of a set of data, search the content of a set of data, or edit a set of data in a specified fashion. Illustratively, the invention could be used to summarize videotape segments, such as news stories from a newscast. Or, the invention could be used to filter videotape segments, such as television programs, and display only those that meet particular criteria. Another illustrative application would be to edit audio or video segments composed of multiple audio or video clips (e.g. making home movies, TV news reports, condensing interviews).

Figure 3:
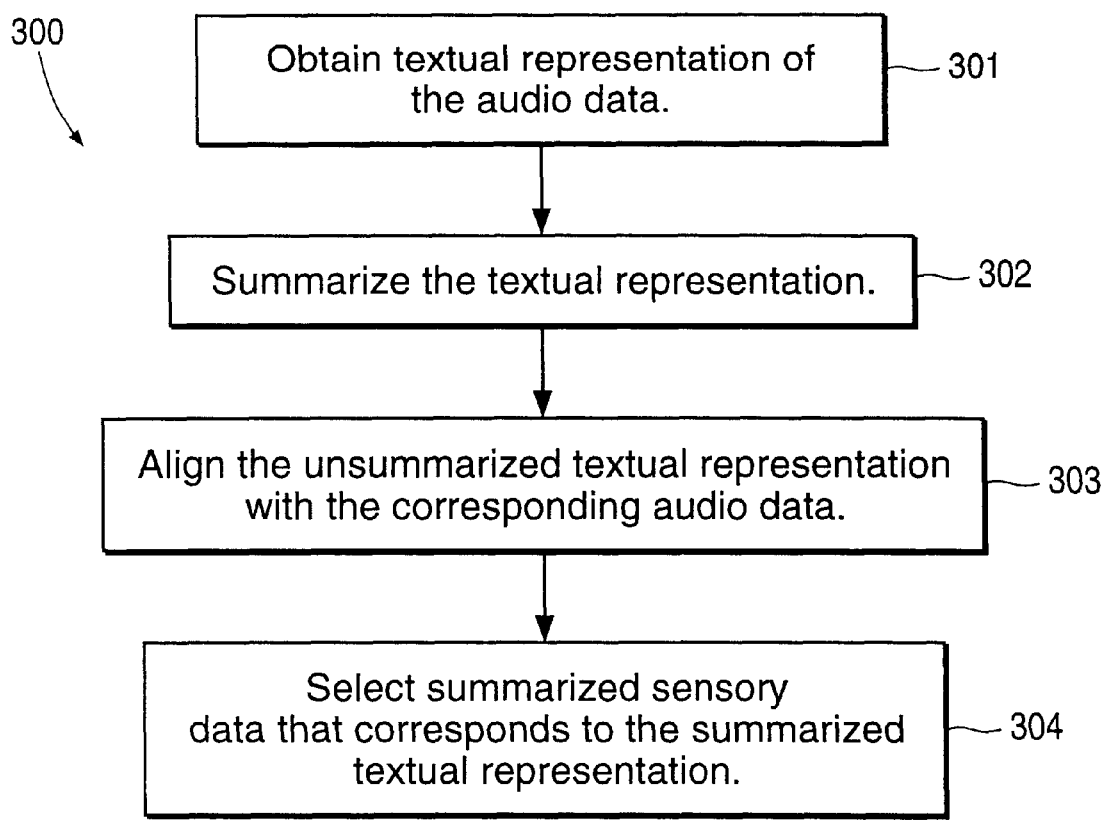
FIG. 3 is a flow chart of a method, according to another embodiment of the invention, for indirectly manipulating one or more sets of sensory data, including at least a set of audio data, using a set of text data that is temporally related to the sets of sensory data.

FIG. 3 is a flow chart of a method 300, according to another embodiment of the invention, for indirectly manipulating one or more sets of sensory data, including at least a set of audio data, using a set of text data that is temporally related to the sets of sensory data. FIGS. 4A through 4E are diagrams illustrating exemplary data transformations that can occur during use of the method of FIG. 3. Below, certain aspects of the invention are described in detail with respect to a particular embodiment of the invention in which the audio and, if desired, video portions of a body of information (e.g., videotape) are summarized using the text portion of the body of information. However, it is to be understood that the invention is not confined to such an embodiment; those skilled in the art will appreciate how the description below can be modified to accomplish manipulation of other types of data or manipulate data in other manners.

Figure 4A:
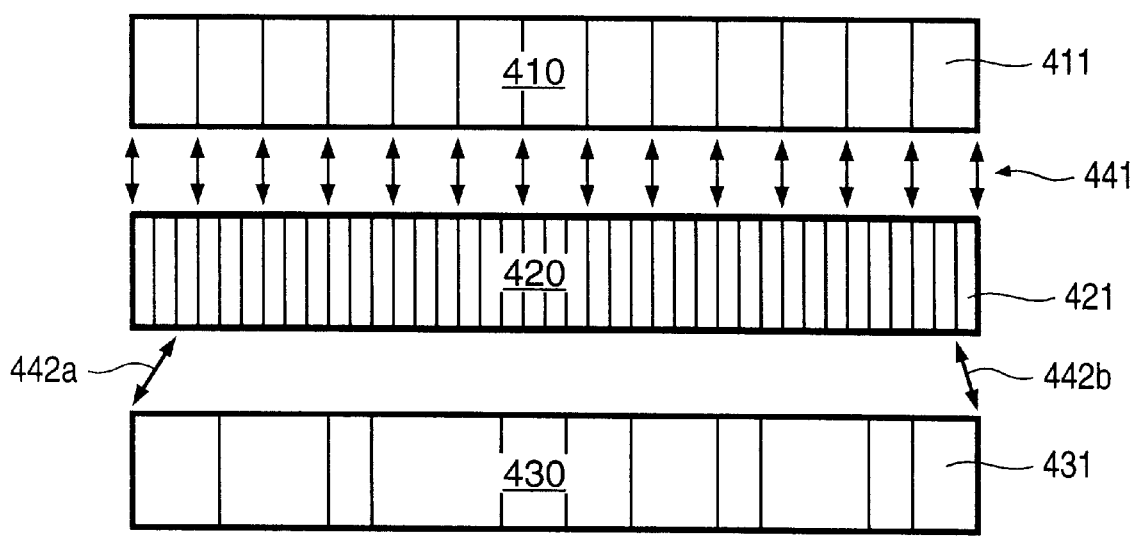
FIGS. 4A through 4E are diagrams illustrating exemplary data transformations that can occur during a particular embodiment of the method of FIG. 3 in which the sets of data are summarized.

FIG. 4A illustrates sets 410, 420 and 430 of temporally related unsummarized video, audio and text data, respectively. Each of the sets of data 410, 420 and 430 represent an aspect of a body of information that describes a temporal event (i.e., an action or actions that occur over a period of time). It is only necessary that the audio data set 420 exist at the beginning of the method 300; the text data set 430 can be created from the audio data set 420 (as described below) and (as indicated above) the video data set 410 is optional.

The unsummarized audio data set 420 represents the "sound track" of the sounds that occur during the temporal event. The unsummarized audio data set 420 can include a multiplicity of audio samples 421 collectively representing the sounds detected during the temporal event, whereby each audio sample 421 is taken at a particular point in time. Preferably, the audio samples 421 can have been obtained at a sample rate that is sufficiently large to capture speech (e.g., greater than or equal to about 6 kHz) and sufficiently small to avoid wastefully capturing inaudible frequencies (e.g., less than or equal to about 44 kHz).

The unsummarized video data set 410 represents the video images that occur during the temporal event. The unsummarized video data set 410 can include a multiplicity of video frames 411, each video frame 411 representing the video image at a particular point in time. Illustratively, the video frames 411 can have been obtained at a frame rate of about 30 frames per second, such as is common in television video.

In step 301 of the method 300 (FIG. 3), a textual representation of the unsummarized audio data set 420 is obtained. This textual representation is shown as the unsummarized text data set 430 in FIG. 4A. The text data set 430 can be obtained in any appropriate manner. A pre-existing textual representation (e.g. closed-caption data or subtitles) of the audio data set 420 may accompany the audio data set 420. For example, one particular use of the method 300 is in summarizing the content of newscasts; closed caption data is frequently part of the data transmitted for audio-visual newscasts. Alternatively, the text data set 430 can be obtained by using any of a number of known speech recognition methods to analyze the audio data set 420 to produce the text data set 430.

The text data set 430 corresponds generally to the audio data set 420. However, as indicated by the bi-directional arrows 442a, 442b, the beginning and end of the text data set 430 may not temporally correspond (i.e., be aligned) with the beginning and end of the audio data set 420. (In FIGS. 4A through 4E, bi-directional arrows extending between data sets indicate that all data in each set corresponds to data in the other set.) It is typically not possible to obtain a text data set 430 that is precisely aligned with the beginning and end of the audio data set 420. This is because the audio data set 420 does not necessarily begin and end with spoken sounds. (This may be because of the nature of the body of information, because it is difficult or impossible to obtain an audio data set 420 that precisely begins and ends with spoken sounds, or because the audio data set 420 was obtained from a set of loosely synchronized closed-caption text to which a few seconds of silence or background noise have been added for the reasons explained below.) In view of this mismatch between the text data set 430 and the audio data set 420, it is preferable to have more audio data than text data, i.e., preferably, the beginning and end of the text data set 430 are located temporally between the beginning and end of the audio data set 420. Therefore, the beginning and/or end of the audio data set 420 will typically contain silence, noise (here, sound other than intelligible spoken words, such as, for example, music, gunfire, or the roar of an engine), or even the beginning or end of another audio data set. The inclusion of extraneous audio data at the beginning and end of the audio data set 420 is preferable because it produces a better alignment of the text data set 430 and the audio data set 420, as described in more detail below.

The unsummarized text data set 430 represents a transcript of the spoken sounds during the temporal event.

In FIG. 4A, the text data set 430 is shown parsed into words, e.g., word 431, as indicated by the vertical lines within the text data set 430 (each pair of vertical lines defines a word). (Hereafter, a word or words of the text data set 430 is designated generally by the numeral 431.) However, this is shown in FIG. 4A only to enhance the illustration of the text data set 430; in practice, the text data set 430 may not be parsed into words 431 until summarization of the text data set 430, as explained below.

Figure 4B:
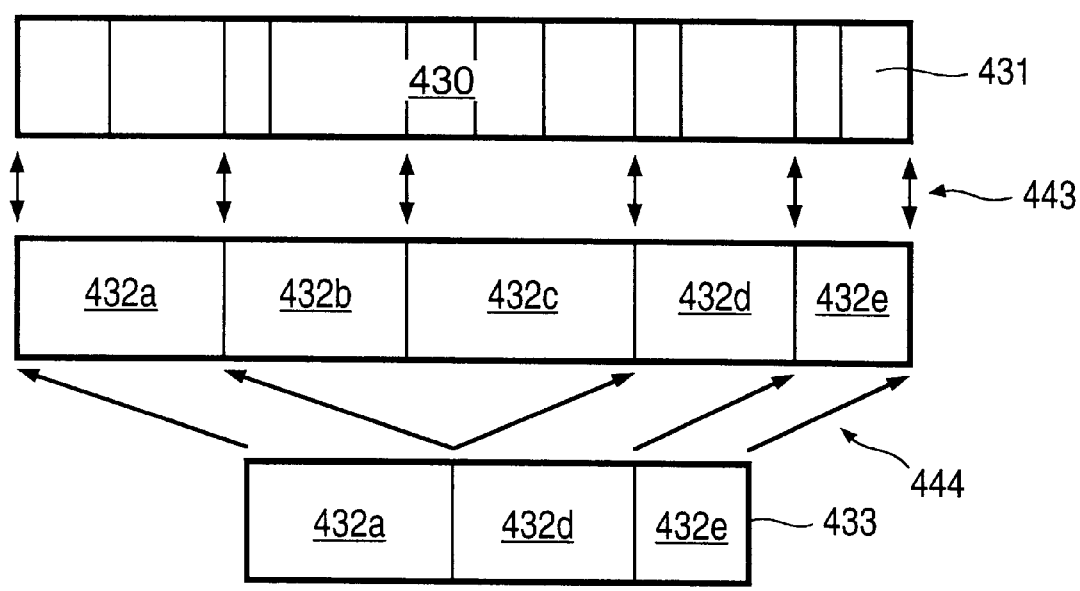

Returning to FIG. 3, in step 302 of the method 300, the text data set 430 is summarized using an appropriate summarization method. FIG. 4B illustrates summarization of the text data set 430. Generally, any text summarization method can be used. A particular example of a text summarization method that can be used with the invention is described in U.S. Pat. No. 5,384,703, issued to Withgott et al. on Jan. 24, 1995. The Withgott et al. method is described briefly below.

While any text summarization method can be used, it may be desirable to tailor the particular text summarization method in accordance with the character (e.g., interview, a documentary or a newscast) of the text data set being summarized. For example, it may be desirable to automatically exclude a certain region or regions of text from the text summary. The automatically excluded regions can be dependent upon the character of the text data set: e.g., when summarizing a news program, phrases similar to, "Stay with us, we'll be right back after these commercial messages," could be automatically excluded. Or, it may be desirable to weight the desirability of including any particular region based upon the region's location within the text data set. For example, when summarizing news articles, regions that occur near the end of the article can be assigned a relatively low weight to reflect their probable lack of importance to the content of the entire article.

As indicated above, during text summarization, the text data set 430 is parsed into words 431. The parsing of the text data 430 set into words 431 can be accomplished using conventional techniques known to those skilled in the art and can be done as part of the text summarization method. As an example, one simple technique for parsing the text data set 430 into words 431 would be to define each set of characters between consecutive occurrences of whitespace as a word 431.

Additionally, as shown in FIG. 4B, the text summarization groups the words 431 together into regions 432a through 432e, each of which include one or more words 431. The beginning and end of each region is inherently aligned with the beginning and end, respectively, of one of the words 431, as shown by the bi-directional arrows designated generally by the numeral 443. Though the regions 432a through 432e are shown in FIG. 4B as being of the same size, this need not be (and typically is not) the case.

Each region 432a through 432e can be, for example, a sentence. However, this can result in summarizations (which are produced by eliminating one or more regions, as described below) that are misleading or nonsensical. For example, imagine a sequence of four sentences as follows:

Sentence 1: Does 2+2=4?
Sentence 2: Yes.
Sentence 3: Does 2+2=5?
Sentence 4: No.

A summary including only sentences 1 and 4 would be misleading. Thus, it may be preferable to establish each region as two or more successive sentences that are closely linked according to one or more predefined criteria.

For example, each interrogative sentence may be coupled together with one or more successive declarative sentences to form a region. In the example given above, a first region would include sentences 1 and 2, while a second region would include sentences 3 and 4; as can be seen, retention of none, one or both of these regions in a summary does not result in the problem identified above.

As another example of a criterion that can be used in establishing regions, a sentence beginning with a conjunction could be coupled together with one or more sentences before it. Since a conjunction expresses a relationship to what has gone before, it is likely that at least the previous sentence is necessary to provide context for the sentence containing the conjunction and should therefore be treated with such sentence as a unit.

Other criteria can also be used. For example, the use of a pronoun in a sentence will often indicate a relationship to a previous sentence or sentences containing a related type of noun, the knowledge of which is necessary to give meaning to the pronoun. Thus, a rule might be established that, for any sentence including a pronoun, the gender and number of the pronoun is established, and the next preceding sentence (as well as any intervening sentences) containing a noun (e.g., a proper name) that matches the pronoun in gender and number is grouped together with the sentence containing the pronoun as a region. In the following example, sentences 2, 3, and 4 would be grouped together as a region in accordance with this rule.

Sentence 1: A car sped down First Street.
Sentence 2: Jack was at the wheel.
Sentence 3: Just then, an alarm began ringing.
Sentence 4: He stepped on the accelerator and the car sprang forward even faster.

Without such grouping, if sentence 4 were retained in a summary alone without sentences 2 and 3, a significant portion of the meaning of sentence 4 would be lost.

It is readily apparent that there are many other criteria that could be used to establish a region. Moreover, the criteria used need not be limited to determining whether one or more sentences are to be treated as a unit; the building blocks of a region can be smaller or larger than a sentence. This may, in particular, be true if the language of the text being summarized is other than English. Ultimately, the choice of particular criteria to use will depend upon the degree to which such criteria cause closely integrated parts of a set of text to be treated together as a unit versus the tendency of such criteria to reduce the flexibility with which the set of text can be manipulated.

Further, the numbers of words 431 shown as constituting regions 432a through 432e in FIG. 4B are fewer than would typically be expected.

Once the text data set 430 is divided into regions 432a through 432e, a subset of the regions 432a through 432e is selected for inclusion in a text summary 433. The alignment of the beginning and end of the regions 432a, 432d and 432e chosen to be in the text summary 433 is shown by the uni-directional arrows designated generally by the numeral 444. (The uni-directionality of the arrows indicates that not all of the data in the text data set 430 has corresponding data in the text summary 433.)

The text summary 433 is generated as a subset of the regions of the text data set 430. While the text summary could be generated, instead, as a synthesized summary of the text data set 430, such an approach is not preferred, since audio and video data that correspond to the synthesized text summary would also have to be generated in order for the alignment steps discussed below to be accomplished, and the generation of such synthesized audio and video data may be prohibitively complex.

As discussed elsewhere, the invention enables sets of data to be manipulated in ways other than summarization. It should be noted that such other types of manipulation could be accomplished by embodiments of the invention similar to the one presently being described. Generally, the regions 432a through 432e can be re-ordered or deleted in any desired manner. Moreover, a particular region or regions can be designated to enable selective accessing of the body of information. Further, the text data set 430 can be searched, using conventional text searching techniques, and regions containing text data conforming to a predefined criterion or set of criteria designated, so that a subset of the text data is chosen which includes only regions having a certain type of information.

As indicated above, a text summarization method described by Withgott et al. can be used with the invention. For purposes of illustration of text summarization, a brief description of the Withgott et al. text summarization method is given here; a more detailed description of the method is given in U.S. Pat. No. 5,384,703, the disclosure of which is incorporated by reference herein.

The Withgott et al. method summarizes a text data set based upon the discerned theme of the text data set, taking advantage of the fact that relatively long words tend to be more pertinent to the theme of a text data set than are other words. The text data set is read and words (or "expressions") are identified. Similar words with different prefixes and/or suffixes are deemed to be the same word. "Regions" are also identified as strings of closely-coupled words that should not be split apart, based upon specified criteria. (In practice, a region usually corresponds to a sentence.) Words longer than a specified threshold length are termed "complex." Complex words that appear in the text data set—except those listed in a "stop list" of words deemed to be insufficiently specific to the topic at hand (an initial stop list includes general, common words in the text's language)—are identified and sorted according to frequency of occurrence. The most frequently occurring complex words are identified as "seed" words. Regions within the text data set that include more than a specified number of seed words are designated for inclusion in the text summary. Regions adjacent to included regions can be included based upon other specified criteria:

e.g., if the adjacent region is in the same paragraph, then the region is included in the text summary. A maximum length is specified for the summary. If the text summary is less than the specified maximum length, then the method ends. If not, then another iteration of the method is performed. The previously identified seed words can be added to the stop list (since they apparently were not sufficiently selective) and the threshold length used to identify complex words can be decreased so that more seed words can be identified.

The method described by Withgott et al. requires that the text data set being summarized be about a single theme. Thus, when the text summarization method of Withgott et al. is used with a text data set 430 that includes data regarding several different themes (as would be the case, for example, when the body of information being manipulated is a videotape of a newscast), the text data set 430 must be broken into segments that each only include text data regarding a single theme and each segment summarized separately. Identification of such segments might be included in a pre-existing text data set, e.g., a closed caption transcript of a news program. However, when such segment identification does not already exist (as would be the case, for example, when the text data set is obtained from the audio data set using speech recognition), the identification of segments according to changes in theme can be accomplished in any suitable manner. For example, complex words and seed words, as used in the Withgott et al. method, could be used, together with "hints" as to the occurrence of segment breaks (e.g., transitional words or phrases, recognition of speaker changes), to identify portions of the text data set having the same theme. In the case of a newscast, for example, phrases of the form, "Jane Doe, WXYZ news reporting live from Anytown, USA," can provide demarcations.

As indicated above, the indirect manipulation of a set of data by the invention depends greatly upon alignment of a directly manipulated data set with the set of data desired to be manipulated. Though the video data set 410, audio data set 420 and text data set 430 are temporally related to each other, the data sets 410, 420 and 430 are typically not aligned with each other. Thus, in the particular embodiment of the invention described with respect to FIGS. 4A through 4E, producing an audio summary requires that the audio data set 420 be aligned with the text data set 430.

Figure 4C:
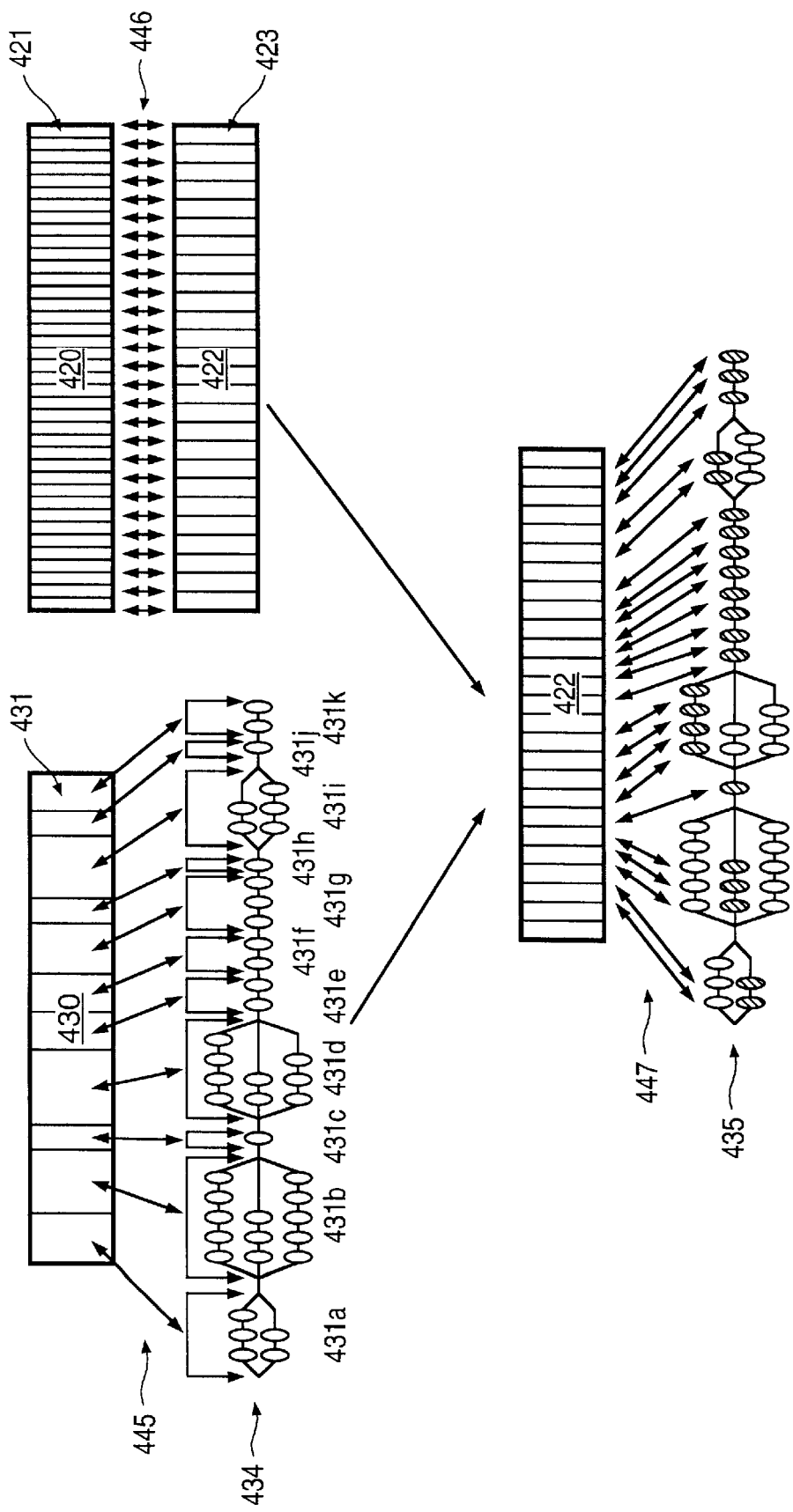

Returning to FIG. 3, in step 303 of the method 300, the unsummarized text data set 430 is aligned with the unsummarized audio data set 420. If the text data set 430 has been obtained from the audio data set 420 using a speech recognition method, then the alignment of the unsummarized text data set 430 with the unsummarized audio data set 420 typically exists as a byproduct of the speech recognition method. However, if such alignment does not exist as a byproduct of the speech recognition method, or if the text data set 430 exists independently of the audio data set 420 (e.g., the text data set 430 is a closed-caption transcript corresponding to the audio data set 420), then the alignment step 303 is more complex. FIG. 4C illustrates a method, according to one embodiment of the invention, of aligning a text data set 430 and an audio data set 420.

As shown in FIG. 4C, in this embodiment, the alignment step 303 can be accomplished in three steps. In a first step (illustrated at the upper left of FIG. 4C), a linguistic transcription network 434 (e.g., a network representing possible phonetic transcriptions) corresponding to the text data set 430 is generated. In a second step (illustrated at the upper right of FIG. 4C), a feature analysis is performed on the audio data set 420 to produce a set of audio feature data 422.

The first and second steps can be implemented either sequentially (in either order) or simultaneously. Implementation of the first and second steps simultaneously advantageously decreases the amount of time required to accomplish the alignment step 303. In a third step (illustrated at the bottom of FIG. 4C), the linguistic transcription network 434 is compared to the audio feature data set 422 to determine a linguistic transcription approximation 435 representing the best fit linguistic transcription from all of the possible linguistic transcriptions of the linguistic transcription network 434.

The embodiment of the alignment step 303 illustrated in FIG. 4C can be implemented using the Viterbi method. Briefly, in such an implementation, in the first step discussed above, the linguistic transcription network 434 can be constructed as a multi-tiered Hidden Markov Model (HMM) network which models the spoken text (text data set 430) in terms of possible corresponding audio data. In one embodiment, a top tier of the HMM network can include possible ways to represent the text data set 430 in terms of words (word transcriptions), a next lower tier can include possible transcriptions of the words in the top tier in terms of basic linguistic units (phonemes, in one embodiment of the invention), and a bottom tier can include possible ways (based upon the different ways in which different speakers can pronounce the basic linguistic units, e.g., phonemes) of representing the basic linguistic units in terms of audio features. In another embodiment, the HMM network has two tiers rather than three: the basic linguistic unit is the word (possible word transcriptions comprise the top tier), so only a single lower tier, composed of representations of individual words in terms of audio features, is necessary. The construction of such multi-tiered HMM networks is described in detail below. After the feature analysis of the audio data set 420 performed in the second step, the third step can be performed by determining the path (i.e., the linguistic transcription approximation 435) through the HMM network, from all possible paths, which represents the best fit to the audio feature data set 422. In other words, the observed speech (audio data set 420) is compared to the spoken text (text data set 430) to find the most probable possible representation of the spoken text in view of the observed speech. The match between the linguistic transcription approximation 435 and the audio feature data set 422 enables the alignment between the audio data set 420 and text data set 430 to be ascertained, since the features in the audio feature data set 422 are aligned with the audio samples of the audio data set 420, and since the audio features of the linguistic transcription approximation 435 are, through the HMM network, aligned with the words of the text data set 430.

Figure 5:
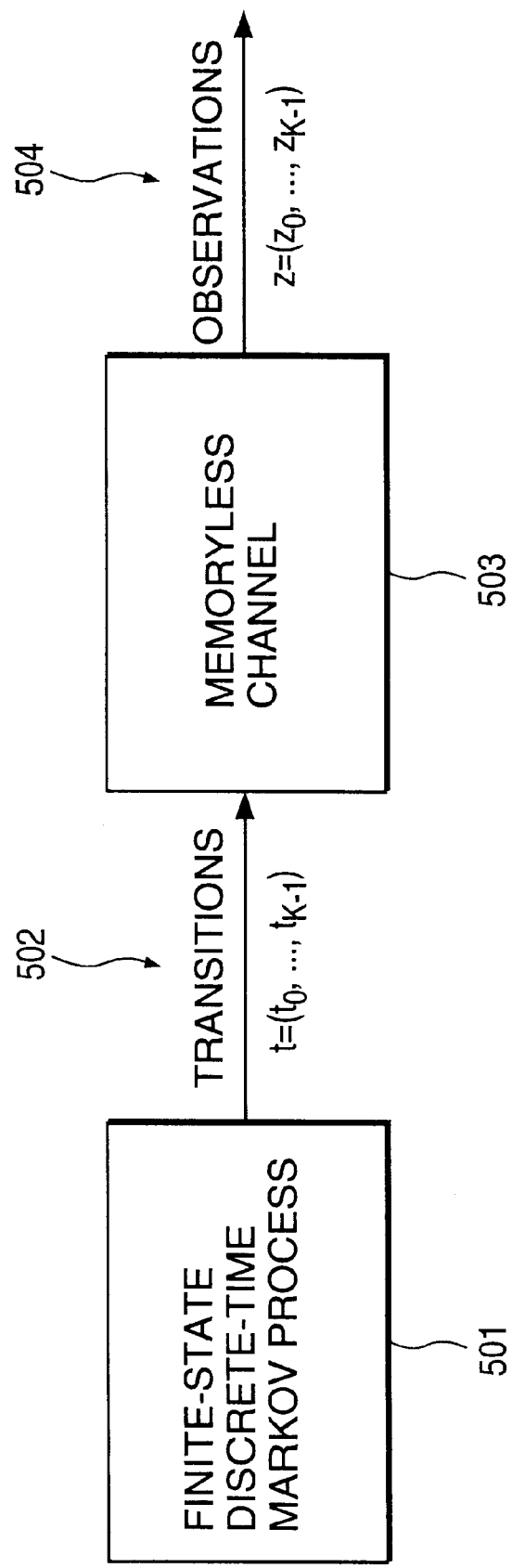
FIG. 5 is a diagrammatic representation of the general problem which the Viterbi method solves, the Viterbi method being a method that can be used to implement one aspect of the invention.

Following is a brief generalized description of the Viterbi method. A more detailed explanation of the Viterbi method can be found in "The Viterbi Algorithm," by G. David Forney Jr., Proceedings of the IEEE, Vol. 61, No. 3, March 1973, the disclosure of which is incorporated by reference herein. FIG. 5 is a diagrammatic representation of the general problem which the Viterbi method solves. The box 501 represents a determination of the probabilities of possible sequences of a finite-state discrete-time Markov process. As the name suggests, the state space of the Markov process is finite and time is discrete. A state sequence of length K+1 can thus be represented by a vector $x = (x_0, \ldots, x_K)$, or alternatively, as a set of state transitions 502 by a vector $t = (t_0, \ldots, t_{K-1})$. There is a one to one mapping between x and t. A Markov process is one in which $P(x_{k+1}|x_0, x_1, \ldots, x_K) = P(x_{k+1}|x_k)$, i.e. the history of how state $x_k$ was reached does not influence the state $x_{k+1}$. The box 503 represents a "memoryless channel". The memoryless channel is noisy, meaning that the set of observations 504 are a probabilistic function of the transition, $z_k=P(t_k)$. Given this, $P(z|x)=P(z|t)$ is the sum product of $P(z_k|t_k)$ over all k, 0, ..., K. In particular, given a set of observations 504, the Viterbi method finds the state sequence with the highest $P(z|x)$. Such a state sequence can be interpreted as the best "fit" or the best "explanation" for the set of observations 504.

Figure 6A:
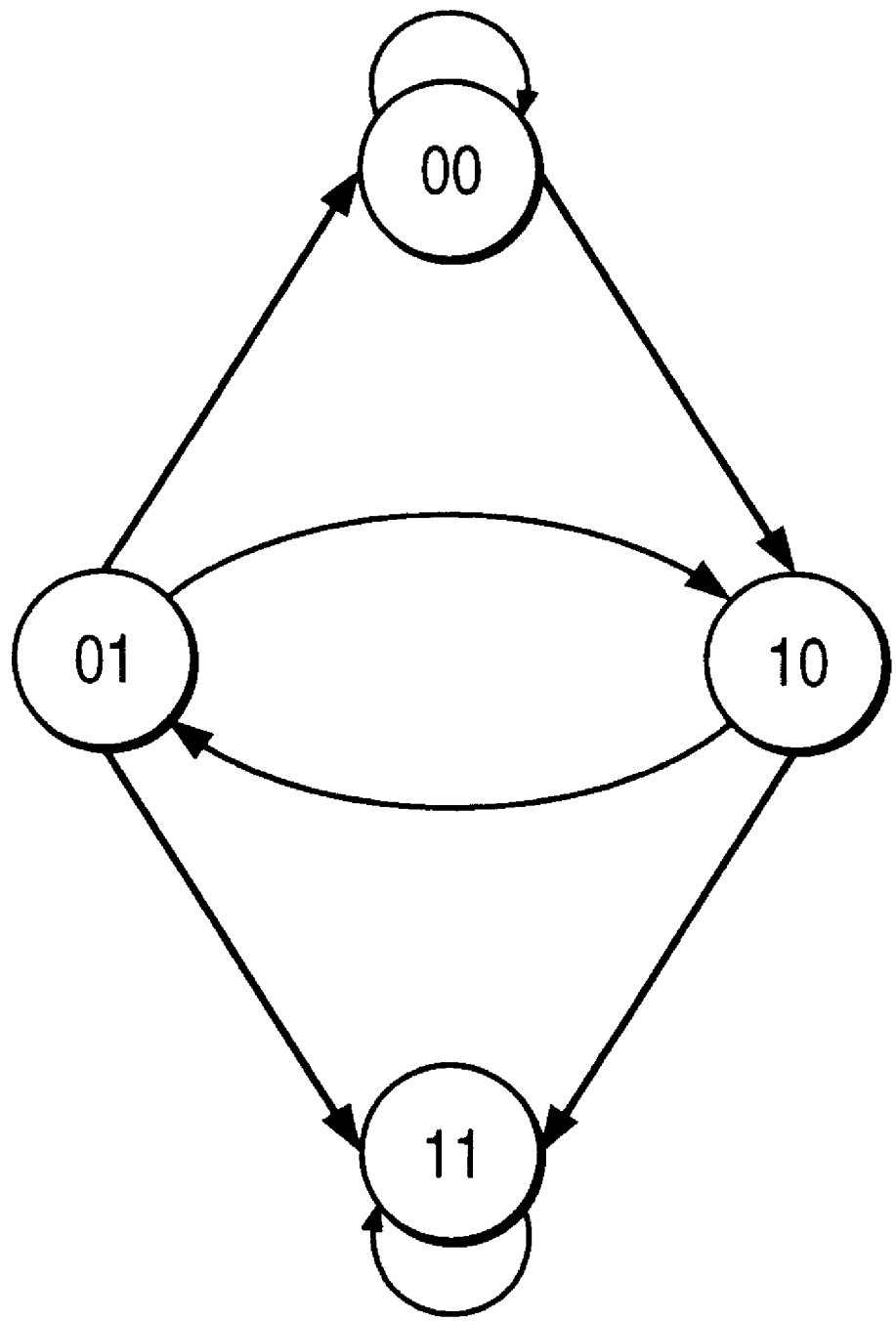
FIGS. 6A and 6B illustrate two depictions of the same exemplary finite state process.
Figure 6B:
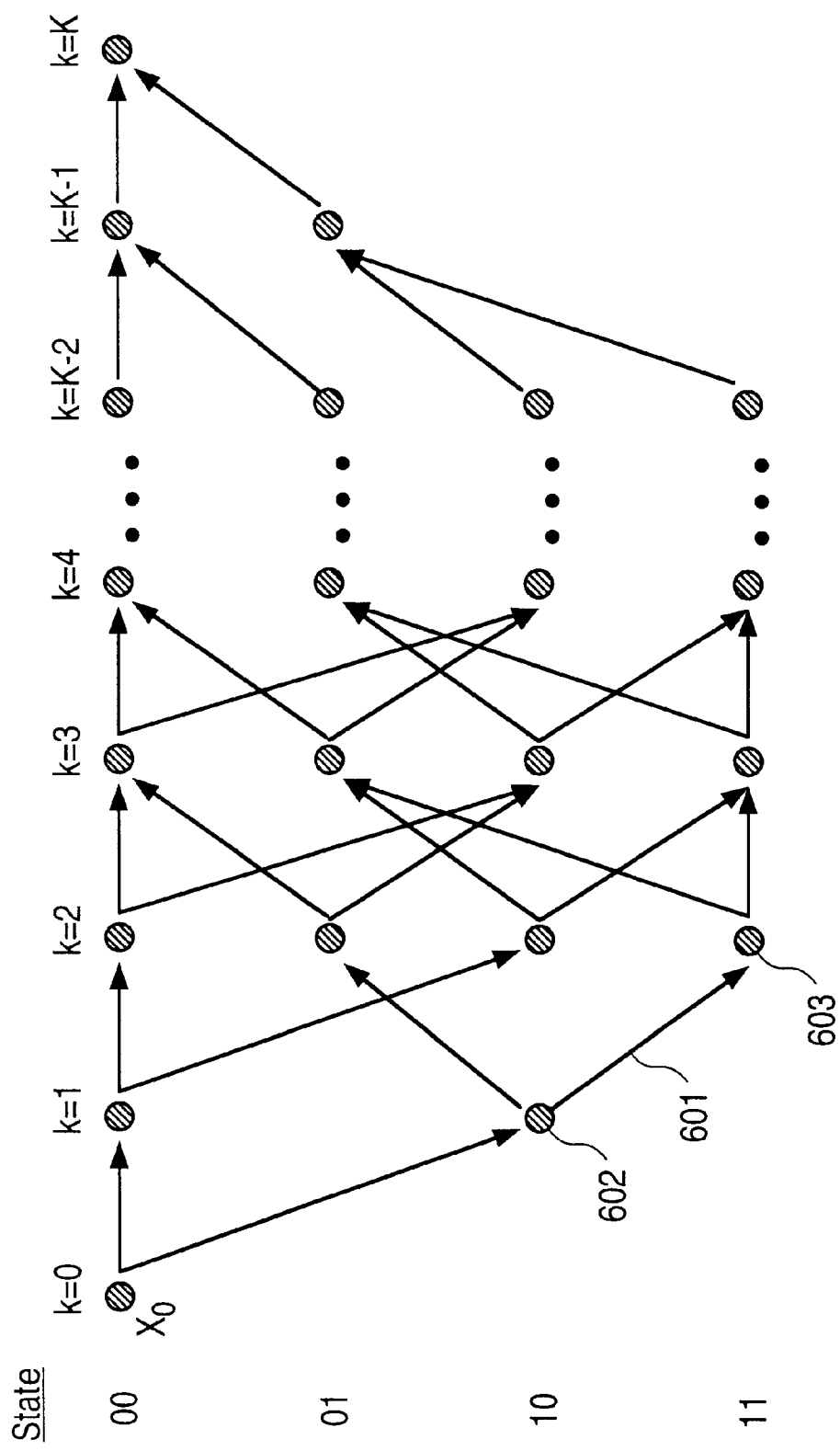

FIG. 6A depicts a finite state machine for a Markov process, specifically one which models a four-state shift register (transition probabilities are not depicted). FIG. 6B is a "trellis" representation of the state machine of FIG. 6A which represents all possible state sequences (or "Paths") of time length K starting and ending in state 00. Each path includes one or more branches, e.g., branch 601, extending between two nodes, e.g., nodes 602 and 603. Each node represents a state at a given time and each branch represents a transition at a given time.

In general, for any trellis and any given set of observations 504, if the branches are assigned lengths equal to $\ln P(x_{k+1}|x_k) - \ln P(z_k|t_k)$, then the shortest path through the trellis is the one with the highest $P(z|x)$.

The Viterbi method proceeds recursively as follows. The method begins at an initial node $x_0$ at time k=0 with all path lengths initialized to 0. For each successive increment of time, all branches from "surviving" paths are followed, the branch lengths being added to the cumulative path lengths. For each state $x_{k+1}$ at time k+1, all paths which terminate at $X_{k+1}$ and which have the minimum length of all those terminating in $x_{k+1}$ are stored, together with this minimum length. These paths are the "surviving" paths at time k+1. The Viterbi method terminates at time k=K with one or more surviving paths having equal and minimum length. For purposes of the invention, one of these paths can be chosen arbitrarily as the shortest path, i.e., the "best fit".

The Viterbi method is of complexity O(KM) in terms of storage space, where K is the length and M the number of states, and of exponential complexity $O(KM^2)$ in terms of computation. The former can be mitigated by truncating paths at a certain length, discarding initial segments once these are (presumed) to be established.

The Viterbi method can be tailored for use in aligning a set of audio data including speech to a set of text data representing the speech. A detailed discussion of the application of the Viterbi method to speech recognition can be found in "A Tutorial on Hidden Markov Models and Selected Applications in Speech Recognition," by Lawrence R. Rabiner, Proceedings of the IEEE, Vol. 77, pp. 257–286, February 1989, the disclosure of which is incorporated by reference herein.

As discussed above, in one embodiment of the invention, the linguistic transcription network 434 can be constructed as a network of Markov models, i.e. state machines (here, Hidden Markov Models or HMMs, since the states are not observed directly), for a pre-determined set of basic linguistic units, whereby state transitions correspond to audio features. Typically, the basic linguistic units are either whole words or sub-word units such as phonemes, phones, diphones, demisyllables, syllables, fenemes, fenones, etc. Such sub-word units can be very small units of speech that provide a means for distinguishing utterances from each other. In the detailed description below of a particular embodiment of the alignment step 303, the basic linguistic unit is the phoneme; however, it is to be understood that alignment in other embodiments of the invention can be accomplished making use of any other appropriate basic linguistic unit, some examples of which are given above.

Figures 7A, 7B:
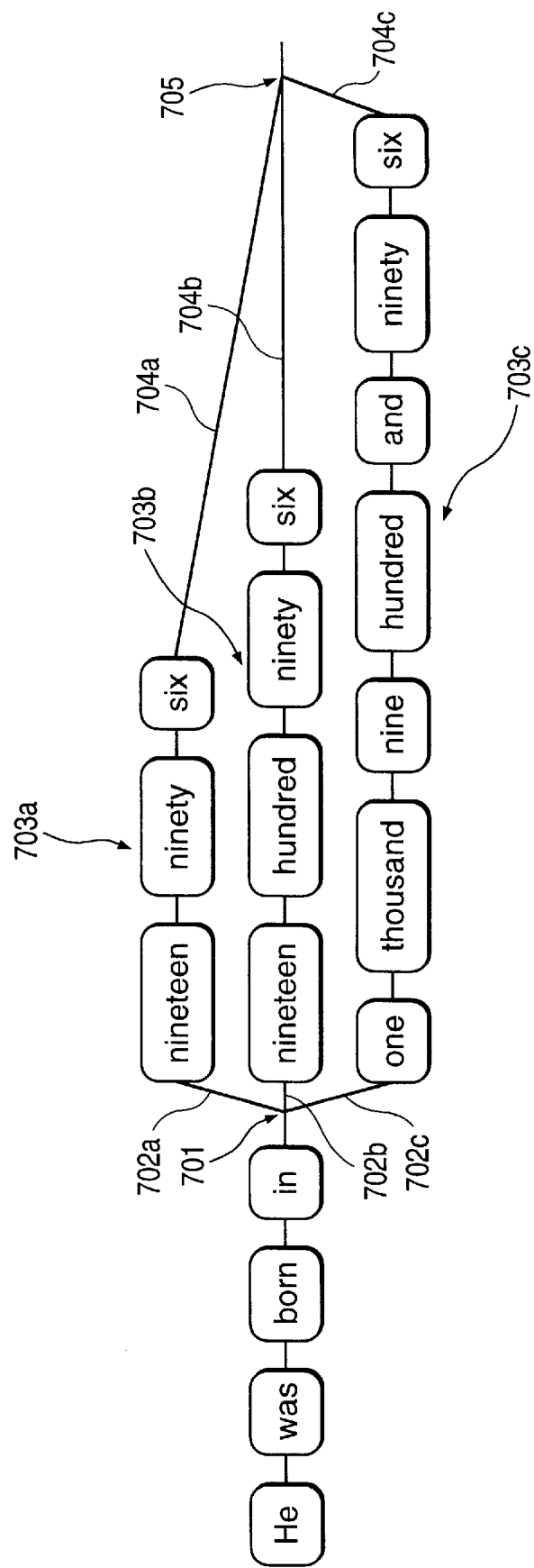
FIG. 7A is a sentence that can be a set or a part of a set of text data that can be manipulated according to a method of the invention.
FIG. 7B is a transcription network representing various ways that the sentence of FIG. 7A can be represented in words.

In a first, "pre-processing" stage, non-word units in the text data set are replaced with subnetworks representing different word transcriptions of the non-words. FIG. 7A is a sentence that can be a set or a part of a set of text data that can be manipulated according to a method of the invention. FIG. 7B is a transcription network representing various ways that the number in the sentence of FIG. 7A can be represented in words. The network of FIG. 7A corresponds to the top tier of a three-tier HMM network as discussed above. As can be appreciated, and as illustrated in FIGS. 7A and 7B and by the examples below, the conversion of non-words (e.g. numbers, special characters, abbreviations, acronyms) in the text data set to words may not be straightforward. The exact functionality of the pre-processing stage depends on multiple factors, including the language in which the text data set is expressed, whether or not the text data set is guaranteed to have only words, and, if not, how many and what types of non-words are expected to appear. The discussion immediately following illustrates functionality that might be included in an embodiment of the invention intended for use with a text data set expressed in English.

An example of a non-word that can be simply transformed into a word is the symbol "%", which can be transformed straightforwardly into the word "percent." However, some special characters and numbers are more problematic. For example, the symbol "$," which typically appears in front of a number often must be relocated within the text data to come after the number when converted into the word "dollar", e.g., "$40" is transformed into "forty dollars".

FIGS. 7A and 7B, which illustrate the formation of the top tier of an HMM network for a simple sentence, also illustrate the difficulty that can be encountered in converting a number into words. The sentence shown in FIG. 7A includes the number "1996." As can be appreciated by a human reader, "1996," as used in this sentence, represents a date: the year 1996. However, a digital computer programmed to implement a method according to the invention for creating an HMM network from this sentence is not so smart. Thus, the number "1996" may represent a quantity, in which case "1996" could be spoken, for example, as "one thousand, nine hundred and ninety six," or "nineteen hundred ninety six" or "nineteen hundred and ninety six." Even if it were known that "1996" represents a year, the number might still be said as "nineteen ninety six," "nineteen hundred ninety six," or "nineteen hundred and ninety six." Thus, in the pre-processing stage a subnetwork for "1996" is preferably constructed to account for these different possibilities. This can be done by connecting the subnetworks for each (three are shown in FIG. 7B) of the possible pronunciations (word transcriptions) as shown in FIG. 7B. Three null transitions 702a, 702b and 702c lead from an input node 701 into three subnetworks 703a, 703b and 703c, each of which is followed by a corresponding exit transition 704a, 704b and 704c, respectively, into a common exit node 705. (A more sophisticated embodiment could incorporate rules or heuristics to figure out from context which word transcription is most likely.) Probabilities must be assigned to the input transitions 702a, 702b and 702c. Any reasonable assignment is acceptable, including arbitrarily setting each to be ⅓. (A more precise assignment, representing English the way it is usually spoken, would give a greater likelihood to "nineteen ninety six" than to "nineteen hundred ninety six," unless the input text was "1,996," in which case networks including the words "one thousand" should be heavily favored.) The probability of each output transition 704a, 704b and 704c is 1.

Figures 1, 7C:
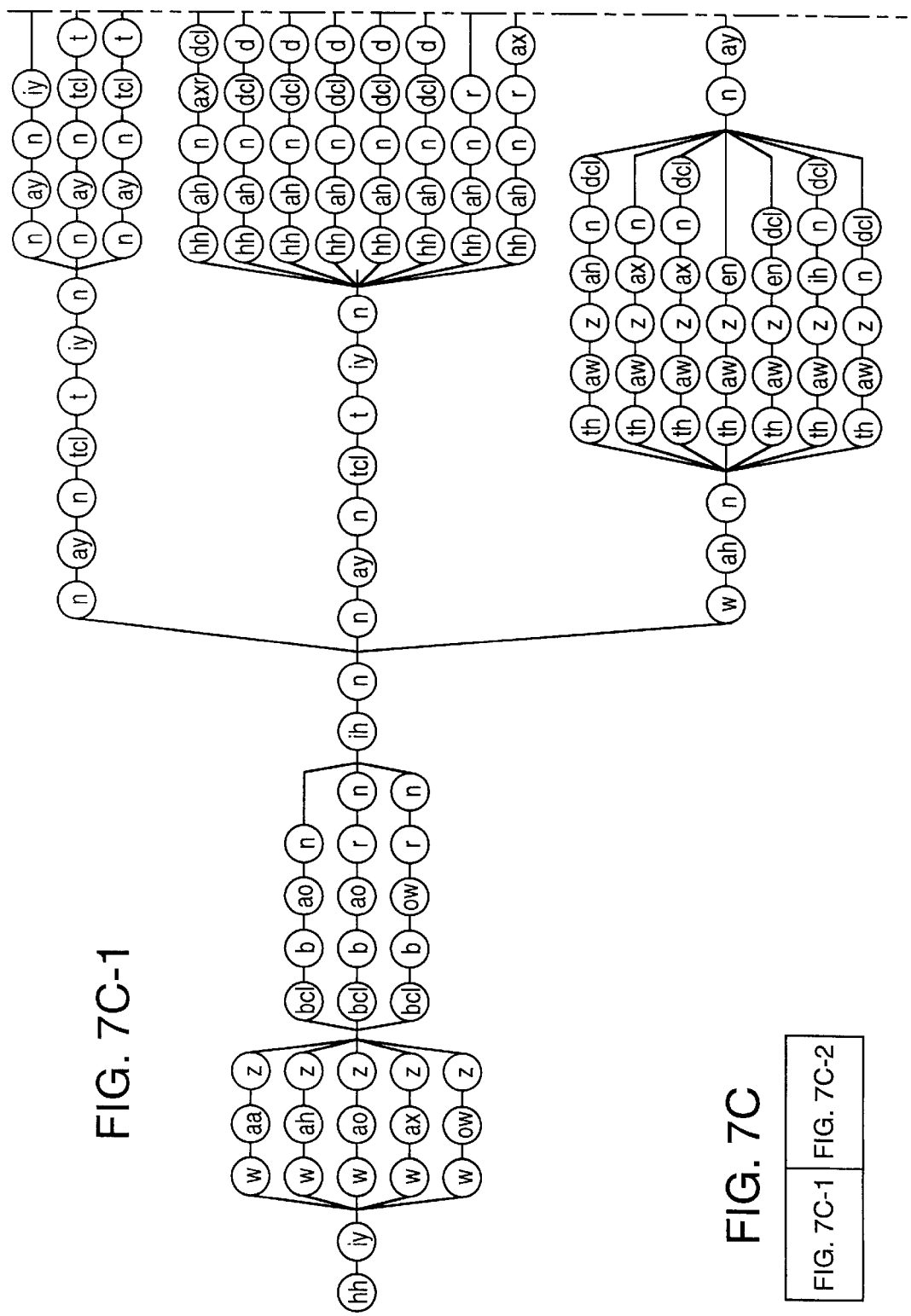
FIG. 7C is a phonetic transcription network representing various ways that the transcription network of FIG. 7B, and thus the sentence of FIG. 7A, can be decomposed into phonemes.
Figures 2, 7C:
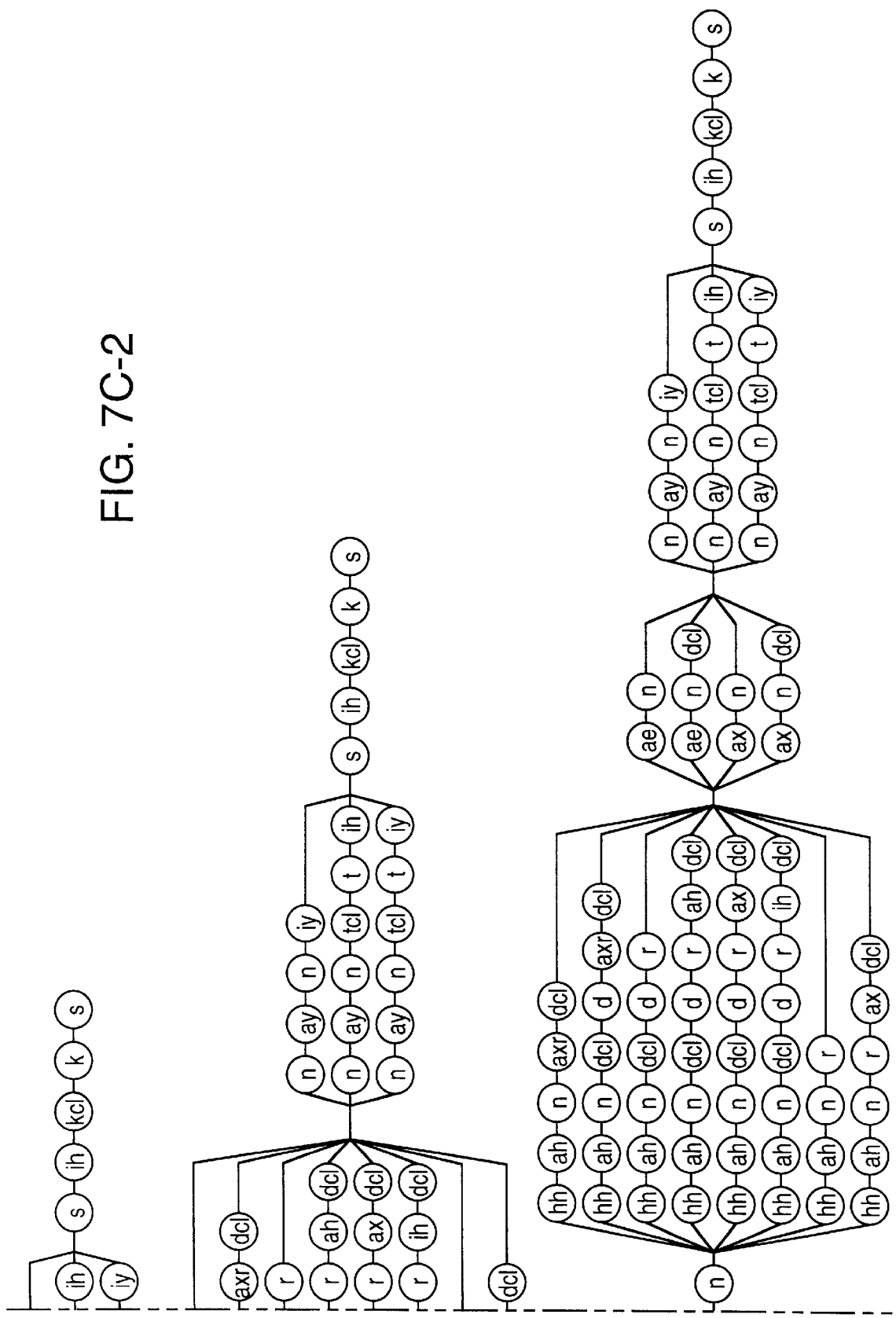

Another example of functionality that can be implemented in the pre-processing stage to account for potentially problematic portions of a text data set is to assume that, in a set of text data including both upper and lower case letters, fully-capitalized words represent acronyms. Based on this assumption, a subnetwork could be constructed to include the possibility that each letter is spoken separately, rather than as a word formed of all the letters pronounced together. In a next step of the formation of an HMM network after the pre-processing stage, subnetworks representing individual words in terms of basic linguistic units are substituted for each word occurrence in the highest tier of the HMM network. Subnetworks representing silence or noise between words are represented as well. If the basic linguistic unit is the phoneme, this yields a phonetic transcription network. FIG. 7C, discussed below, illustrates such a phonetic transcription network. Each phonetic transcription of a word consists of one or more phonemes. For example, the word "men" can be decomposed into three phonemes "m," "eh," and "n" and represented by a network consisting of an HMM subnetwork (as explained further below) for the phoneme "m," followed by an HMM subnetwork for "eh," which is, in turn, followed by an HMM subnetwork for "n." Each of the HMM subnetworks for the individual letters is connected to adjacent subnetworks by a transition.

To enable recognition of a word, a network can be constructed with null transitions from an initial node into subnetworks for each of a predefined set of possible words (i.e., a "lexicon"), each subnetwork having a null exit transition leading to a final node and labeled with the word that the subnetwork represents. Given a spoken word, the path through the network with the highest probability corresponds to the most probable word. To recognize a stream of continuous speech, a null transition from the final node back to the initial node is added. Higher level syntactic and semantic constraints can also be incorporated into a network, as known to those skilled in this art.

There may be multiple ways to pronounce a word. For example, the word "the" can be represented by the phonetic sequences "dh ah," "dh ax," or "dh iy." An HMM subnetwork for the word "the" in terms of phonemes could be constructed as follows. The network begins with the HMM audio feature subnetwork for "dh." This subnetwork is followed by three null transitions (i.e., transitions that do not correspond to audio features). Each null transition leads into an HMM audio feature subnetwork for one of the phonemes "ah," "ax," and "iy," respectively. A null exit transition follows each of those phonemes, each null exit transition leading into a common node.

The possible phonetic transcriptions for each word can be generated using techniques known to those skilled in the art. For example, the information could be stored in a dictionary. The dictionary could be augmented with rules for handling common prefixes, suffixes, and other word parts. If a word doesn't appear in the dictionary, one possibility is to simply transcribe the word using a special "phoneme" that indicates that the word includes an unknown phoneme or phonemes. Or, the most similar word in the dictionary can be substituted. For languages with sufficiently regular pronunciation (a good example would be German), a set of rules can be used to derive possible phonetic transcriptions, with exceptions stored in a dictionary. In any case, the phonetic transcription need not be perfect. An erroneous transcription in one part of the text will have minimal or no impact on alignment in other parts of the text determined using the Viterbi method.

It is nevertheless important to generate a high quality HMM network (or other linguistic transcription network 434), ideally modeling multiple possible ways of reading the text data set, as well as multiple possible ways of pronouncing words, since this directly affects the quality of the alignment. A more detailed network is computationally more expensive, both to generate, and in terms of applying the Viterbi method to compare the linguistic transcription network 434 to the audio feature data set 422 to determine the linguistic transcription approximation 435. However, the increased number of possible paths modeled by a larger network increases the chances of finding a better alignment between the text data set 430 and the audio data set 420 and thus improves the accuracy of the alignment between the text data set 430 and the audio data set 420.

FIG. 7C is a phonetic transcription network representing various ways that the transcription network of FIG. 7B, and thus the sentence of FIG. 7A, can be decomposed into phonemes. (Subnetworks for silence and noise between words are omitted.) As can be seen, some words have multiple possible phonetic transcriptions. Note also that different phonetic transcriptions of a particular word can have different numbers of phonemes.

Returning to FIG. 4C, the construction of a linguistic transcription network in terms of basic linguistic units (e.g., phonemes) is illustrated. Each of the words 431 in the text data set 430 maps to a subnetwork in the linguistic transcription network 434. For example, in the linguistic transcription network 434 the word 431a has two possible transcriptions, one including two basic linguistic units and the other including three basic linguistic units. The word 431b has three possible transcriptions: two of the transcriptions include five basic linguistic units and the other includes three basic linguistic units. The word 431c has only a single transcription including a single basic linguistic unit. The word 431d has a single transcription including two basic linguistic units.

The number of possible linguistic transcriptions of a set of words (e.g., sentence) is the number of paths through the linguistic transcription network corresponding to the set of words. For example, in FIG. 4C, the number of linguistic transcriptions (in terms of basic linguistic units) represented by the linguistic transcription network 434 is equal to the product of the number of possible linguistic transcriptions of each word in the text data set 430. Thus, there are 36 (2 * 3 * 1 * 3 * 1 * 1 * 1 * 1 * 2 * 1 * 1) possible transcriptions in terms of basic linguistic units modeled by the linguistic transcription network 434. The shortest transcription has 21 basic linguistic units; the longest has 27 basic linguistic units.

The HMM network is completed by replacing each occurrence of a basic linguistic unit (or silence or noise) with a subnetwork representing the basic linguistic unit (or silence or noise) in terms of audio features. In a manner similar to that described above with respect to the construction of the phonetic transcription network, different phonemes can be represented by different sequences of audio features. Each sequence can have a different number of audio features. Moreover, different occurrences of the same phoneme can map to different numbers of audio features. Thus, multiple possible audio feature sequences are associated with each phoneme so that each possible phonetic transcription of the linguistic transcription network becomes itself a set of possible audio feature sequences. (Though not shown in the figures, the representation of a linguistic transcription network in terms of audio features bears a relationship to the corresponding representation of the linguistic transcription network in terms of phonemes, such as shown in FIG. 7C, that is similar to the relationship that the phonetic representation bears to the word-level representation, such as shown in FIG. 7B.) The audio feature sequences can be culled from a pre-computed library of HMM subnetworks of phonemes in terms of audio features. Such subnetworks are based on thousands of samples from a multitude of speakers and provide a general way of describing a phoneme so that the phoneme can be recognized independent of, for example, the speaker or the speaking condition of the speaker, the context of the phoneme (i.e., the surrounding phonemes), or the intonation with which the phoneme is spoken (e.g., as part of a statement or as part of a question).

The above transformations are accomplished such that, after each transformation, each node and each transition in the resultant network effectively contains a reference to the corresponding word or region in the original text. This can be done by storing an explicit reference in each node, or by storing a reference in a node whenever the word or region changes. This provides the alignment between the linguistic transcription network and the text data set 430. This alignment between the linguistic transcription network 434 and the text data set 430 is shown by the bi-directional arrows designated generally by the numeral 445 in FIG. 4D.

The transcription of each phoneme into one or more audio feature sequences produces a network of audio features that can then be compared directly to an audio feature data set that represents the audio data set that is related to the text data set. Returning to FIG. 4C, the audio feature data set 422 can be produced by performing a feature analysis on the audio data set. Note that, for simplicity, the audio features 423 of the audio feature data set 420 are depicted as not overlapping, although they may. The alignment of the audio features 423 with the audio samples 421 is straightforward and is shown in FIG. 4C by the bi-directional arrows designated generally by the numeral 446.

Audio feature analysis can be accomplished in any suitable manner. For example, the audio samples 421 from the audio data set 420 can be converted into quantitative feature vectors (i.e., audio features 423) by a signal processing method known as LPC (Linear Predictive Coding) feature analysis. The feature vectors are mapped to discrete states used in the HMMs of the linguistic transcription network. The salient point of LPC feature analysis is that consecutive speech samples are blocked into audio frames that have a fixed sample length and that are spaced a fixed, sufficiently short (for alignment, with video frames in this case) length apart. For example, with a 6.67 kHz audio sample rate (one audio sample every 150 microseconds), an audio frame length of 300 samples, and a frame spacing of 100 samples, the audio frame is 45 milliseconds, the overlap 30 milliseconds, and the audio frame spacing 15 milliseconds. Once the linguistic transcription network 434 and the audio feature data set 422 have been determined, the calculation of the fit between the audio feature data set 422 and the linguistic transcription network 434 can be accomplished in any suitable manner. In one embodiment of the invention, the Viterbi method is used to compare the paths through the linguistic transcription network 434 to the audio feature data set 422 to determine which path is the stochastically most likely path, in view of the audio feature data set 422. This path is shown as the linguistic transcription approximation 435 in FIG. 4C. The process of comparing each audio feature sequence of the linguistic transcription network 434 to the audio feature data set 422 produces a match between the audio features of the linguistic transcription approximation 435 and the audio feature data set 422 that provides the alignment between the linguistic transcription approximation 435 and the audio feature data set 422. This alignment is shown in FIG. 4C by the bi-directional arrows designated generally by the numeral 447.

As stated above, each node in the path represented by the linguistic transcription approximation 435 effectively contains a reference that can be traced to a corresponding region in the original text data set 430. Therefore, there is a match between regions in the text data set 430 and audio features 423 in the audio feature data set 422: alignment is achieved.

As described above, the audio data set 420 preferably includes audio samples 421 that occur both temporally before the beginning of the text data set 430 and temporally after the end of the text data set 430. When the Viterbi method is used to determine the best fit between the paths of the linguistic transcription network 434 and the audio feature data set 422, this extraneous audio data (which may be silence, noise or speech that is not part of the temporal event that is intended to be represented by the audio data set 420) is matched with designations (e.g., phonetic designations) for such extraneous audio data rather than with basic linguistic units from the linguistic transcription network 434. However, if the text data set 430 includes text data that begins temporally before the audio data set 420 or temporally after the end of the audio data set 420, the Viterbi method cannot recognize that the matching audio data for such text data lies outside the audio data set 420 and will force other audio data to be aligned with that text data: hence, an incorrect alignment is obtained. Thus, to ensure the best possible alignment of the text data set 430 and the audio data set 420, the audio data set 420 can be specified to ensure that all of the text data in the text data set 430 corresponds to audio data within the audio data set 420. For example, when the audio data set 420 is the audio portion of a news story in a news broadcast and the text data set 430 is the closed-caption text transcription of the news story, the audio data set 420 can be chosen to include a little audio both before and after the news story (e.g., the end of the preceding news story and the beginning of the succeeding news story). Alternatively, rather than specifying the audio data set 420 to ensure that all of the text data in the text data set 430 corresponds to audio data within the audio data set 420, the linguistic transcription network 434 can be constructed so that the beginning and ending of each path (e.g., beginning and ending phonemes) are optional. Thus, if the beginning or end of the text data set 430 includes text data that does not correspond to audio features 423 of the audio data set 420, the beginning or end of a path (e.g., extra phonemes at the beginning and/or end of a phonetic transcription) of the linguistic transcription network 434 can be discarded by the Viterbi method during calculation of the fit for that path.

Relative to other parts of the method 300, the use of the Viterbi method to calculate the fits between the audio feature data set 422 and the paths through the linguistic transcription network 434 is relatively time consuming. Moreover, as the size of the data sets 410, 420 and 430 increases, the length of time required to perform the alignment step 303 increases at greater than a linear rate. The execution of the Viterbi method in the alignment step 303 can be speeded up by subdividing the text data set 430 and audio data set 420 into smaller parts, and individually aligning corresponding parts of the text data set 430 and audio data set 420. Though some time must be spent in subdividing the text data set 430 and audio data set 420, the decrease in time necessary to complete the Viterbi method more than makes up for this lost time. Generally, the text data set 430 and audio data set 420 can be subdivided into any desired number of parts and each part need not be equal in size. However, as discussed further below, the size of a part is constrained by the fact that the quality of the alignment decreases as the size of the data sets being aligned decreases. Further, it is preferable, as discussed above, to ensure that all of the text data of each part of the text data set corresponds to audio data within the corresponding part of the audio data set 420. Thus, the parts of the audio data set 420 should be specified so that there is some overlap between the end of a part being aligned and the beginning of an immediately succeeding part. With the exception of the first part of the audio data set 420, it is not necessary that the beginning of a part being aligned include extra audio data (e.g., overlap the end of the immediately preceding part). This is because alignment of the immediately preceding part of the audio data set 420 will have provided an indication of exactly where the immediately preceding part of the audio data set 420 ends; only audio data after this point need be included in the next part of the audio data set 420. (However, if desired, such overlap can be allowed.)

Alternatively, as described above, rather than specifying the parts of the audio data set 420 so that there is overlap between adjacent parts, the paths through the linguistic transcription network 434 could be specified so that the beginning and end of the paths are optional. Thus, if a part of the text data set 430 includes text that does not correspond to features of the corresponding part of the audio data set 420, the beginning and/or end of a path can be discarded during calculation of the fit by the Viterbi method.

The steps 302 (text summarization) and 303 (alignment of the text data set 430 and audio data set 420) of the method 300 (FIG. 3) can be performed in either order, or can be performed simultaneously. Performance of the steps 302 and 303 simultaneously advantageously decreases the amount of time required to complete the method 300.

Figure 4D:
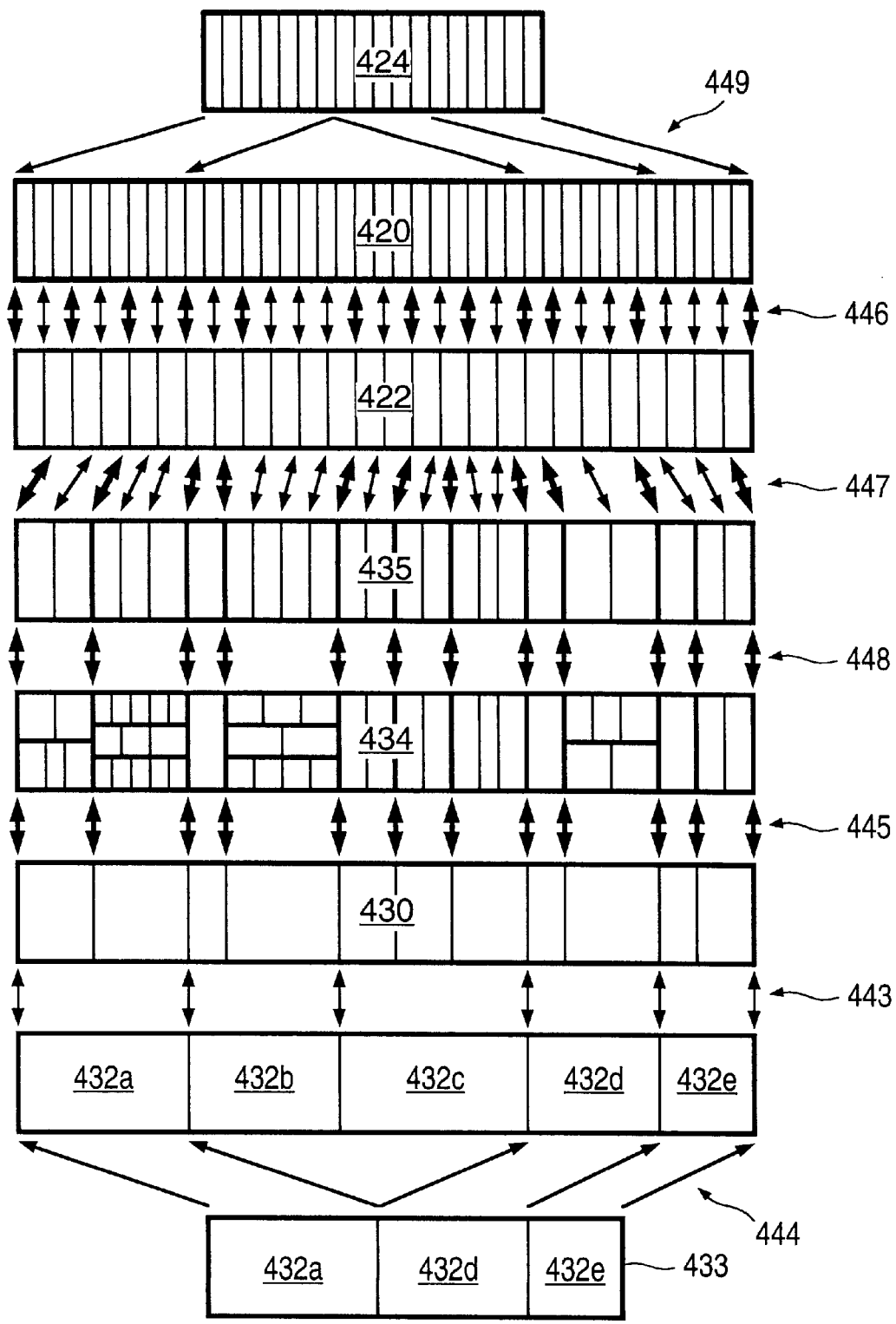

Returning to FIG. 3, in step 304 of the method 300, an audio summary 424 that corresponds to the text summary 433 is determined, using the alignment produced in step 303. FIG. 4D illustrates how the text summarization illustrated in FIG. 4B and alignment illustrated in FIG. 4C are used to produce the audio summary 424. (In FIG. 4D, the heavy alignment arrows indicate alignments corresponding to the boundaries of words in the text data set 430. Additionally, the linguistic transcription network 434 and linguistic transcription approximation 435 are shown in FIG. 4D in a slightly different manner than that in which they are shown in FIG. 4C.) The beginning and end of each region 432a, 432d and 432e of the text summary 433 are inherently aligned (arrows 444 and 443) with the corresponding locations within the text data set 430, since the regions 432a, 432d and 432e are determined directly from the text data set 430. The alignment (arrows 445) of the beginning and end locations of the regions 432a, 432d and 432e in the text data set 430 with the corresponding locations in the linguistic transcription network 434 results from the word-by-word linguistic transcription of the text data set 430 that occurs during the alignment step 303 (FIG. 3). The alignment (shown by the arrows designated generally by the numeral 448) between the beginning and end locations of the regions 432a, 432d and 432e in the linguistic transcription network 434 and the corresponding locations within the linguistic transcription approximation 435 is also determined during the alignment step 303. The alignment step 303 also produces alignment (arrows 447) between the beginning and end locations of the regions 432a, 432d and 432e in the linguistic transcription approximation 435 and corresponding features 423 of the audio feature data set 422, as described above. The alignment (arrows 446) of audio features 423 in the audio feature data set 422 (and, in particular, the audio features 423 that correspond to the beginning and end locations of the regions 432a, 432d and 432e) with audio samples 421 in the audio data set 420 is also a product of the alignment step 303 and results from the definition of a feature 423 as a particular number of samples 421. The audio summary 424 is produced by selecting the audio samples 421 that occur between the locations within the audio data set 420 of the beginning and end of each region 432a, 432d and 432e of the text summary 433, as shown by the alignment arrows designated generally by the numeral 449.

In another embodiment of the invention, the alignment step 303 is performed using only the text summary 433 and portions of the audio data set 420 that are selected to roughly correspond to the regions 432a, 432d and 432e of the text summary 433, rather than the entire text data set 430 and audio data set 420. In this embodiment, unlike the embodiment of the method 300 described above and shown in FIG. 3, it is, of course necessary to perform the text summarization step 302 before the alignment step 303. Further, it is not necessary to perform the audio summarization step 304, since the alignment of the portions of the audio data set 420 with the text summary 433 inherently produces an audio summary 424.

In this embodiment, as with the modification to the Viterbi method described above, it is important to ensure that the portions of the audio data set 420 are selected so that all of the text data of the corresponding regions 432a, 432d or 432e corresponds to audio data within a portion of the audio data set 420. Approximate beginning and ending points for the portions of the audio data set 420 can be determined using any suitable technique. Any points of synchronization between the audio data set 420 and text data set 430 that are available before the alignment can be exploited for this purpose. An example of a body of information for which such synchronization points exist is a television broadcast. The commercial breaks within a television broadcast can be marked in both the audio and text data sets, thereby providing synchronization points. Or, if time-stamped closed caption text is provided, then this can be used to provide approximate synchronization to a resolution of several seconds (i.e., the typical amount of time by which a closed caption transcript trails the corresponding speech). Alternatively, the length of the text (number of characters or number of words) can be used to calculate approximate points of synchronization.

This embodiment of the invention can be particularly useful when the data sets 410, 420 and 430 are relatively large. This is particularly true because of the greater than linear increase in the length of time required to perform the alignment step 303 as the size of the data sets 410, 420 and 430 increases. On the other hand, aligning the entire text data set 430 and audio data set 420 may be necessary or preferred when it is not possible or it is excessively difficult to select the audio portions corresponding to the text regions 432a, 432d or 432e. Additionally, since the quality of the alignment increases as the length of the text data set 430 and audio data set 420 increases, the increased length of time required for the alignment of the entire text data set 430 and audio data set 420 may be an acceptable cost of achieving the higher quality alignment.

Figure 4E:
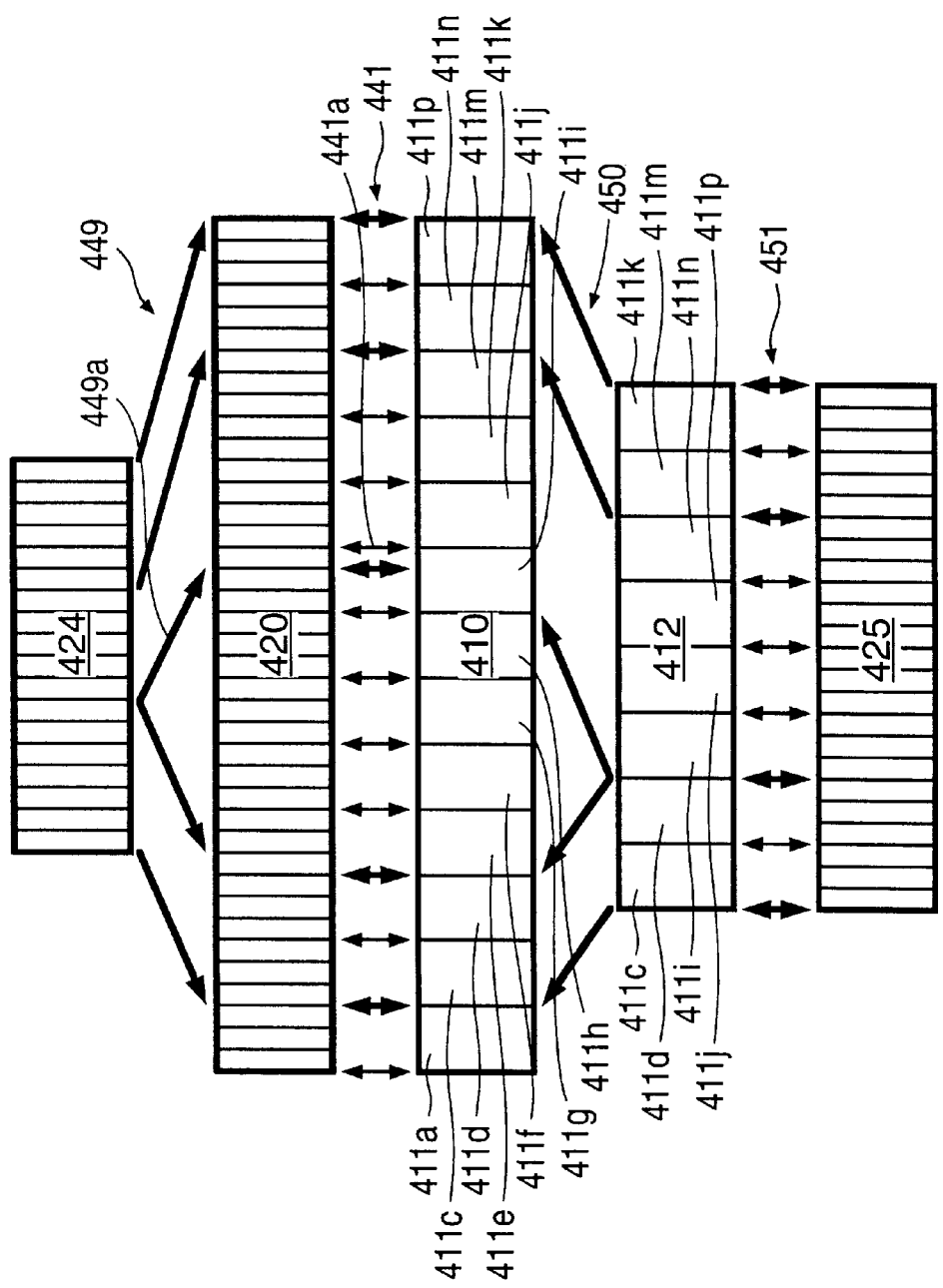

Returning to FIG. 4A, the body of information being summarized may also include a video data set 410. FIG. 4E illustrates how the audio summary 424 can be used to produce a video summary 412. The audio data set 420 and video data set 410 must be aligned (shown by arrows 441 in FIG. 4A). The audio/video alignment 441 can either be pre-existing (because the audio data set 420 and video data set 410 were recorded together, the alignment being inherent because of the like time-stamps associated with each data set 410 or 420) or calculated easily (the time-stamp for an audio sample 421 or video frame 411 can be calculated by multiplying the time duration of each sample 421 or frame 411 by the sequence number of the sample 421 or frame 411 within the audio data set 420 or video data set 410, respectively). The audio summary 424 is aligned (arrows 449) with the audio data set 420, as described above (FIG. 4D). The video summary 412 is produced by extracting from the frames 411a through 411p of the video data set 410 the frames 411c, 411d, 411i, 411j, 411k, 411m, 411n and 411p during which samples included in the audio summary 424 occurred (this is accomplished using a set of time-stamps that indicate the beginning and end of the text regions 432a, 432d or 432e in the audio summary 424). The alignment of frame boundaries between the video data set 410 and the video summary 412 is shown by the arrows designated generally by the numeral 450. The bold-faced arrows in the set of arrows 441 indicate the alignment locations corresponding to the beginning and end of the regions 432a, 432d and 432e of the text summary 433; these bold-faced arrows define the frames of the video data set 410 that are to be extracted from the video summary 412.

Generally, the beginning and end of the regions 432a, 432d and 432e of the text summary 433 need not fall at the intersection of adjacent frames 411 of the video data set. According to one embodiment of the invention, when either the beginning or the end of one of the regions 432a, 432d and 432e of the text summary 433 does not fall at the intersection of adjacent frames 411, the entire frame 411 in which such beginning or end falls is included in the video summary 412; this situation is shown in FIG. 4E by the arrows 449a and 441a. When this occurs, it is necessary to modify the audio summary 424 to include the audio corresponding to the additional portions of the frames 411 that have been included, thus producing the revised audio summary 425. This is accomplished using the alignment between the video data set 410 and the audio data set 420, and the alignment between the audio data set 420 and the audio summary 424. The alignment between the frames 411 of the video summary 412 and the samples 421 of the revised audio summary 425 is shown by the arrows designated generally by the numeral 451. Alternatively, rather than including the extra audio data from the audio data set 420 in the revised audio summary 425, the revised audio summary is filled out with silence (or suitable neutral background noise). This is a particularly desirable alternative when it is believed that the extra audio data will typically be audio data that is unrelated to the audio data included in the audio summary 424.

In another embodiment of the invention, the video data set 410 could be summarized independently of the summarization of the audio data set 420, i.e., directly from a summary of the text data set 430 using an alignment between the video data set 410 and the text data set 430. Such alignment could be achieved with a subtitled video data set, the subtitles being compared to the text data set 430 to ascertain a proper correspondence between the video data and the text data. "Gaps" (i.e., portions of a related sequence of audio or video data that do not correspond to any text data) can occur in the audio summary 424 and/or video summary 412. This can occur for example, when two adjacent text regions, e.g., regions 432a and 432b in FIG. 4B, are separated by a period of silence or noise. As an illustration, a pause by a speaker between successive sentences (i.e., adjacent regions) may not appear as part of the audio summary 424 or video summary 412 as produced by the method discussed above. Such a gap is likely disruptive to the continuity of the audio summary 424 and video summary 412, making it desirable to include the gap in the summaries 424 and 412. This problem can be addressed by causing gaps between parts of the audio summary 424 or video summary 412 that occur between adjacent text regions to be automatically included in the summaries 424 and 412 if the gap is longer than a specified amount of time (the length of the gap can be calculated from the time-stamps that indicate the beginning and end of the text regions 432a, 432d or 432e in the summaries 424 and 412).

As another illustration of a gap, a news story on a hurricane may include, between discussion of the hurricane by newscasters, footage of the hurricane during which no speaking occurs. The text before and after the hurricane footage may be selected as part of the text summary 433. However, the hurricane footage would not appear as part of the audio summary 424 or video summary 412 because of the lack of corresponding text data. While such a gap would probably be less disruptive to the continuity of the audio summary 424 and video summary 412, it may still be desirable to include the gap in the summaries 424 and 412. Inclusion of such gaps in the summaries 424 and 412, can be accomplished by, for example, specifying that the summaries 424 and 412 are to include all data from the audio data set 420 and video data set 410, except data corresponding to text regions not included in the text summary 433 and data occurring between two text regions that are not included in the text summary 433.

As an enhancement, the first and last frames of each segment of the video summary 412 corresponding to one or more contiguous regions can be repeated one or more times, effectively introducing a pause between unrelated segments of the video summary 412. The audio summary 424 (or revised audio summary 425) can be modified to include silence or suitable neutral background noise that corresponds to these added frames of the video summary 412.

Figure 8:
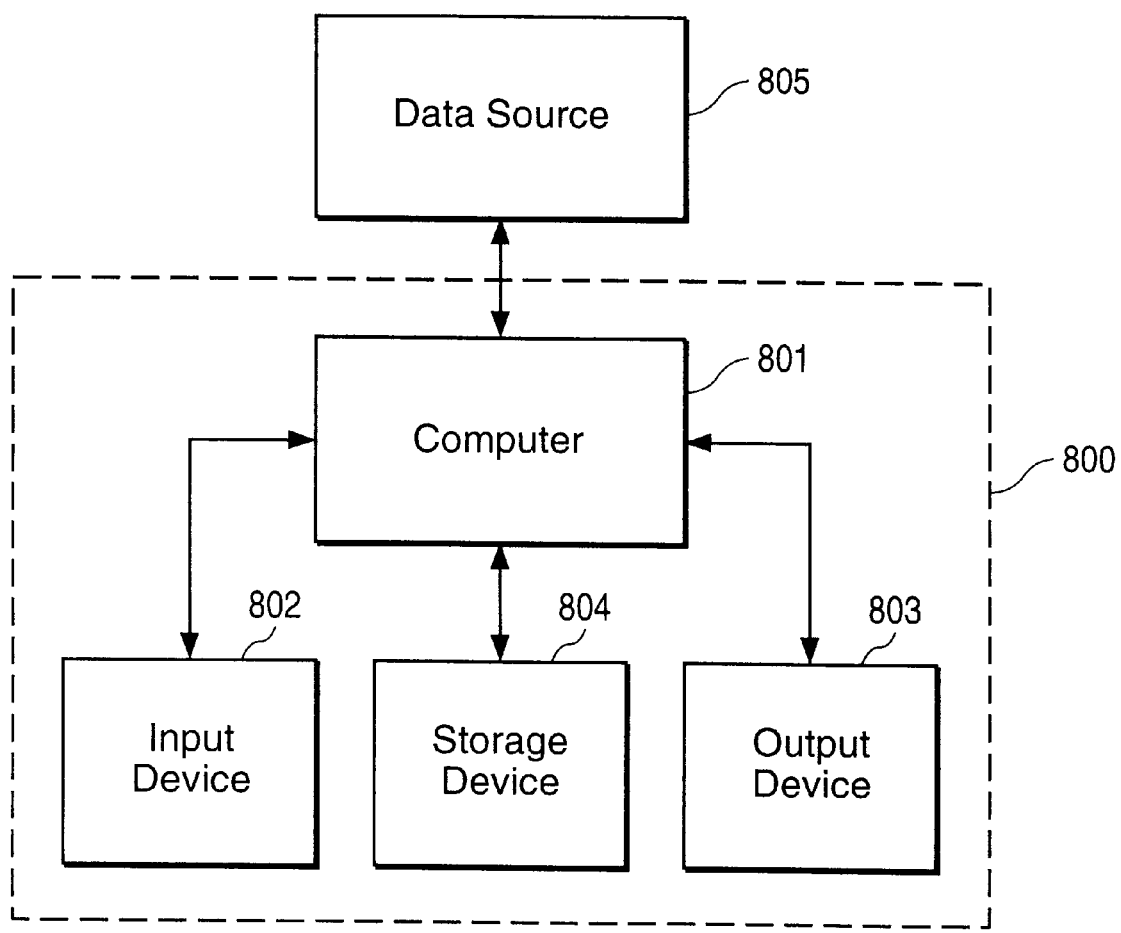
FIG. 8 is a simplified block diagram of a system that can be used to implement the invention.

FIG. 8 is a simplified block diagram of a system 800 that can be used to implement the invention. The data source 805 supplies bodies of information to the system 800 for manipulation and can be any of a wide variety of data sources, such as, for example, news wire services, news programs, information networks (e.g., public networks such as the Internet or proprietary networks such as America Online™), videotapes or audiotapes. The system 800 includes a computer 801, an input device 802 and an output device 803 and/or storage device 804. Communication between the computer 801, input device 802, output device 803, storage device 804, and data source 805 can be accomplished using conventional communications and computer bus hardware and software. The above-described methods for manipulating a body of information can be advantageously implemented on a digital computer (such as the computer 801), as known by those skilled in the art, using appropriate computer programs written in any appropriate computer programming language. Such computer programs could also be stored on any appropriate computer readable storage medium to enable the computer programs to easily be used with a variety of computers. The computer 801 can also include a memory that enables storage of summarized sets of data, or storage of unsummarized sets of data and pointers to portions of the unsummarized sets of data that are part of summarized sets of data. (If background sound is added to an audio summary, data representing the background sound must also be stored.) The input device 802 (which can be, for example, a conventional keyboard, mouse or touch screen) can be used to specify the body of information to be manipulated and the manner in which the body of information is to be manipulated. The output device 803 (which can be, for example, a conventional computer display, a television and/or a set of audio speakers) can be used to display options for use in controlling the system 800 (e.g., options to enable selection of a body of information or specification of the type of manipulation desired), as well as display the results of the manipulation of the body of information (e.g., a video or audio summary). Generally, summarized data produced by the invention can be displayed in any appropriate manner. For example, if the data includes audio data alone, then the summarized audio data can be presented with a suitable audio system, such as a stereo. If the data includes video as well as audio data, then the summarized audio and video data can be presented with a suitable audiovisual system, such as a television.

Various embodiments of the invention have been described. The descriptions are intended to be illustrative, not limitative. Thus, it will be apparent to one skilled in the art that certain modifications may be made to the invention as described without departing from the scope of the claims set out below. For example, while the invention is described above as used to manipulate audio and/or video data, the invention could also be used to manipulate, for example, text or tactile data; generally, the invention can be used to manipulate data of any type.

We claim:

1. A method for indirectly modifying a second set of data that is temporally related to a first set of data, comprising the steps of:

modifying the first set of data in a predetermined manner to produce a modified first set of data;

aligning the first set of data with the second set of data to establish a temporal correspondence between the first and second sets of data, wherein a temporal correspondence does not exist between the first and second sets of data prior to the step of aligning; and automatically modifying data from the second set of data that is aligned with data from the modified first set of data, in accordance with the modification of the first set of data, to produce the modified second set of data.

2. A method as in claim 1, wherein the first and second sets of data are sets of digital data.

3. A method as in claim 1, wherein the first and second sets of data are sets of analog data.

4. A method as in claim 3, further comprising the steps of:

digitizing the first set of analog data to produce a first set of digital data; and digitizing the second set of analog data to produce a second set of digital data.

5. A method as in claim 1, wherein:

the first set of data is an audio data set; and the second set of data is a video data set.

6. A method as in claim 1, wherein:

the first set of data is a text data set; and the second set of data is an audio data set.

7. A method as in claim 6, further comprising the step of producing the text data set from the audio data set.

8. A method as in claim 6, wherein the step of aligning the audio data set with the text data set further comprises the steps of:

generating a linguistic transcription network that models the text data set in terms of audio features;

performing a feature analysis on the audio data set to produce a set of audio feature data; and determining the path through the linguistic transcription network which represents the best fit with the set of audio feature data.

9. A method as in claim 1, wherein a third set of data is temporally related to both the first and second sets of data, the method further comprising the steps of:

aligning the third set of data with either the first or second sets of data to establish a temporal correspondence between the third set of data and the first or second sets of data; and automatically modifying data from the third set of data that is aligned with data from the modified first or second set of data to produce a modified third set of data.

10. A method as in claim 9, wherein:

the first set of data is a text data set;

the second set of data is an audio data set; and the third set of data is a video data set.

11. A method as in claim 10, wherein:

the step of aligning the first set of data with the second set of data further comprises the step of aligning the text data set with the audio data set; and the step of aligning the third set of data with either the first or second sets of data further comprises the step of aligning the video data set with the audio data set.

12. A method as in claim 11, wherein:

the step of modifying the first set of data further comprises the step of summarizing the text data set in the predetermined manner, thereby producing a text summary;

the step of automatically modifying data from the second set of data further comprises the step of selecting audio data that is aligned with the text summary, thereby producing an audio summary; and the step of automatically modifying data from the third set of data further comprises the step of selecting video data that is aligned with the audio summary, thereby producing a video summary.

13. A method as in claim 1, wherein the step of modifying the first set of data further comprises the step of summarizing the first set of data in the predetermined manner to produce a summarized first set of data, the step of automatically modifying the second set of data thereby producing a summarized second set of data.

14. A method as in claim 13, wherein:

the first set of data is a text data set; and the second set of data is an audio data set.

15. A method as in claim 1, wherein the step of modifying the first set of data further comprises the step of editing the first set of data in the predetermined manner to produce an edited first set of data, the step of automatically modifying the second set of data thereby producing an edited second set of data.

16. A system for indirectly modifying a second set of data that is temporally related to a first set of data, comprising:

means for modifying the first set of data in a predetermined manner to produce a modified first set of data;

means for aligning the first set of data with the second set of data to establish a temporal correspondence between the first and second sets of data, wherein a temporal correspondence does not exist between the first and second sets of data prior to alignment of the first and second sets of data; and means for automatically modifying data from the second set of data that is aligned with data from the modified first set of data, in accordance with the modification of the first set of data, to produce the modified second set of data.

17. A computer readable storage medium on which are stored instructions for indirectly modifying a second set of data that is temporally related to a first set of data, comprising:

instructions for modifying the first set of data in a predetermined manner to produce a modified first set of data;

instructions for aligning the first set of data with the second set of data to establish a temporal correspondence between the first and second sets of data, wherein a temporal correspondence does not exist between the first and second sets of data prior to the step of aligning; and instructions for automatically modifying data from the second set of data that is aligned with data from the modified first set of data, in accordance with the modification of the first set of data, to produce the modified second set of data.

18. A method as in claim 1, wherein:

each of the first and second sets of data include a plurality of segments, the segments of the first set of data being temporally related to the segments of the second set of data;

the step of modifying the first set of data in a predetermined manner to produce a modified first set of data further comprises the step of modifying the segments of the first set of data in a predetermined manner; and the step of automatically modifying data from the second set of data further comprises the step of modifying segments of the second set of data in accordance with the modification of the corresponding segments of the first set of data.

19. A method as in claim 18, wherein:

the step of modifying the first set of data further comprises the step of summarizing one or more of the segments of the first set of data; and the step of automatically modifying the second set of data further comprises the step of summarizing segments of the second set of data that correspond to summarized segments of the first set of data.

20. A method as in claim 19, wherein the first and second sets of data each represent a series of news stories, each segment representing a particular news story.

21. A method as in claim 18, wherein one of the first and second sets of data is a video data set including a plurality of frames of video data; and the method further comprises the step of adding the first and/or last video frame of one or more of the segments of the modified video data set one or more times to the beginning and/or end, respectively, of the segment.

22. A method as in claim 18, wherein:

the first set of data is a text data set;

the second set of data is an audio data set; and the method further comprises the step of defining one or more segments of the audio data set so that the beginning of the audio segment is temporally prior to, or temporally coincident with, the beginning of the corresponding segment of the text data set, and so that the end of the audio segment is temporally subsequent to, or temporally coincident with, the end of the corresponding segment of the text data set.

23. A method as in claim 1, wherein:

the first set of data is a text data set;

the second set of data is an audio data set; and the method further comprises the step of defining the audio data set so that the beginning of the audio data set is temporally prior to, or temporally coincident with, the beginning of the text data set, and so that the end of the audio data set is temporally subsequent to, or temporally coincident with, the end of the text data set.

24. A method for indirectly modifying a second set of data that is temporally related to a first set of data, comprising the steps of:

modifying the first set of data in a predetermined manner to produce a modified first set of data;

aligning the first set of data with the second set of data to establish a temporal correspondence between the first and second sets of data, wherein the step of aligning further comprises the steps of:
dividing the first set of data into a plurality of parts;
dividing the second set of data into a plurality of parts such that each part of the second set of data approximately temporally corresponds to a part of the first set of data;
aligning corresponding parts of the first and second sets of data; and automatically modifying data from the second set of data that is aligned with data from the modified first set of data, in accordance with the modification of the first set of data, to produce the modified second set of data.

25. A method for indirectly modifying a second set of data that is temporally related to a first set of data, comprising the steps of:

modifying the first set of data in a predetermined manner to produce a modified first set of data;

aligning the first set of data with the second set of data to establish a temporal correspondence between the first and second sets of data, wherein at least part of the step of modifying the first set of data is performed at the same time as at least part of the step of aligning the first set of data with the second set of data; and automatically modifying data from the second set of data that is aligned with data from the modified first set of data, in accordance with the modification of the first set of data, to produce the modified second set of data.

26. A method for indirectly modifying a second set of data that is temporally related to a first set of data, comprising the steps of:

modifying the first set of data in a predetermined manner to produce a modified first set of data;

identifying parts of the second set of data that correspond approximately to parts of the first set of data that have been modified;

aligning the modified parts of the first set of data and the corresponding identified parts of the second set of data to establish a temporal correspondence between the first and second sets of data; and automatically modifying data from the second set of data that is aligned with data from the modified first set of data, in accordance with the modification of the first set of data, to produce the modified second set of data.

27. A method for indirectly modifying a second set of data that is temporally related to a first set of data, wherein the first set of data is a text data set, comprising the steps of:

modifying the first set of data in a predetermined manner to produce a modified first set of data;

aligning the first set of data with the second set of data to establish a temporal correspondence between the first and second sets of data; and automatically modifying data from the second set of data that is aligned with data from the modified first set of data, in accordance with the modification of the first set of data, to produce the modified second set of data, wherein the step of automatically modifying data from the second set of data further comprises including in the modified second set of data all data from the second set of data except data which is aligned with data in the first set of data that is not included in the modified first set of data.

28. A method for indirectly modifying a second set of data that is temporally related to a first set of data, wherein the first set of data is a text data set, comprising the steps of:

modifying the first set of data in a predetermined manner to produce a modified first set of data;

aligning the first set of data with the second set of data to establish a temporal correspondence between the first and second sets of data; and automatically modifying data from the second set of data that is aligned with data from the modified first set of data, in accordance with the modification of the first set of data, to produce the modified second set of data, wherein the step of automatically modifying data from the second set of data further comprises including in the modified second set of data all data from the second set of data that is between data corresponding to adjacent data in the modified first set of data.

29. A method as in claim 1, wherein:

the first set of data is a text data set; and the second set of data is a video data set.

30. A method as in claim 1, further comprising the step of displaying the modified second set of data.

31. A method as in claim 8, wherein the step of performing a feature analysis on the audio data set to produce a set of audio feature data further comprises the step of grouping consecutive audio samples of the audio data into audio frames spanning a duration of time of about 45 milliseconds or less.

32. A system as in claim 16, wherein:

the first set of data is an audio data set; and the second set of data is a video data set.

33. A system as in claim 16, wherein:

the first set of data is a text data set; and the second set of data is an audio data set.

34. A system as in claim 33, further comprising means for producing the text data set from the audio data set.

35. A system as in claim 16, wherein a third set of data is temporally related to both the first and second sets of data, the system further comprising:

means for aligning the third set of data with either the first or second sets of data to establish a temporal correspondence between the third set of data and the first or second sets of data; and means for automatically modifying data from the third set of data that is aligned with data from the modified first or second set of data to produce a modified third set of data.

36. A system as in claim 35, wherein:

the first set of data is a text data set;

the second set of data is an audio data set; and the third set of data is a video data set.

37. A system as in claim 36, wherein:

the means for aligning the first set of data with the second set of data further comprises means for aligning the text data set with the audio data set; and the means for aligning the third set of data with either the first or second sets of data further comprises means for aligning the video data set with the audio data set.

38. A system as in claim 37, wherein:

the means for modifying the first set of data further comprises means for summarizing the text data set in the predetermined manner, thereby producing a text summary;

the means for automatically modifying data from the second set of data further comprises means for selecting audio data that is aligned with the text summary, thereby producing an audio summary; and the means for automatically modifying data from the third set of data further comprises means for selecting video data that is aligned with the audio summary, thereby producing a video summary.

39. A system as in claim 16, wherein the means for modifying the first set of data further comprises means for summarizing the first set of data in the predetermined manner to produce a summarized first set of data, the means for automatically modifying the second set of data thereby producing a summarized second set of data.

40. A system as in claim 39, wherein:

the first set of data is a text data set; and the second set of data is an audio data set.

41. A system as in claim 16, wherein the means for modifying the first set of data further comprises means for editing the first set of data in the predetermined manner to produce an edited first set of data, the means for automatically modifying the second set of data thereby producing an edited second set of data.

42. A system as in claim 16, wherein:

each of the first and second sets of data include a plurality of segments, the segments of the first set of data being temporally related to the segments of the second set of data, wherein each segment represents a particular news story;

the means for modifying the first set of data in a predetermined manner to produce a modified first set of data further comprises means for modifying the news stories represented by the first set of data in a predetermined manner, wherein the means for modifying the news stories represented by the first set of data further comprises means for summarizing one or more of the news stories represented by the first set of data; and the means for automatically modifying data from the second set of data further comprises means for modifying the news stories represented by the second set of data in accordance with the modification of the news story as represented by the first set of data, wherein the means for modifying news stories represented by the second set of data further comprises means for summarizing news stories represented by the second set of data in accordance with the summarization of the news story as represented by the first set of data.

43. A system as in claim 16, wherein:

one of the first and second sets of data is a video data set including a plurality of frames of video data;

each of the first and second sets of data include a plurality of segments, the segments of the first set of data being temporally related to the segments of the second set of data;

the means for modifying the first set of data in a predetermined manner to produce a modified first set of data further comprises means for modifying the segments of the first set of data in a predetermined manner;

the means for automatically modifying data from the second set of data further comprises means for modifying segments of the second set of data in accordance with the modification of the corresponding segments of the first set of data; and the system further comprises means for adding the first and/or last video frame of one or more of the segments of the modified video data set one or more times to the beginning and/or end, respectively, of the segment.

44. A system as in claim 16, wherein:

the first set of data is a text data set;

the second set of data is an audio data set;

each of the first and second sets of data include a plurality of segments, the segments of the first set of data being temporally related to the segments of the second set of data;

the means for modifying the first set of data in a predetermined manner to produce a modified first set of data further comprises means for modifying the segments of the first set of data in a predetermined manner;

the means for automatically modifying data from the second set of data further comprises means for modifying segments of the second set of data in accordance with the modification of the corresponding segments of the first set of data; and the system further comprises means for defining one or more segments of the audio data set so that the beginning of the audio segment is temporally prior to, or temporally coincident with, the beginning of the corresponding segment of the text data set, and so that the end of the audio segment is temporally subsequent to, or temporally coincident with, the end of the corresponding segment of the text data set.

45. A system as in claim 16, wherein:

the first set of data is a text data set;

the second set of data is an audio data set; and the system further comprises means for defining the audio data set so that the beginning of the audio data set is temporally prior to, or temporally coincident with, the beginning of the text data set, and so that the end of the audio data set is temporally subsequent to, or temporally coincident with, the end of the text data set.

46. A system as in claim 16, wherein the means for aligning further comprises:

means for dividing the first set of data into a plurality of parts;

means for dividing the second set of data into a plurality of parts such that each part of the second set of data approximately temporally corresponds to a part of the first set of data; and means for aligning corresponding parts of the first and second sets of data.

47. A system as in claim 16, wherein the means for modifying the first set of data operates at least in part at the same time as the means for aligning the first set of data with the second set of data.

48. A system as in claim 16, further comprising means for identifying, after operation of the means for modifying the first set of data and prior to operation of the means for aligning, parts of the second set of data that correspond approximately to parts of the first set of data that have been modified, wherein the means for aligning operates only on the modified parts of the first set of data and the corresponding identified parts of the second set of data.

49. A system as in claim 16, wherein:

the first set of data is a text data set; and the means for automatically modifying data from the second set of data further comprises means for including in the modified second set of data all data from the second set of data except data which is aligned with data in the text data set that is not included in the modified text data set.

50. A system as in claim 16, wherein:

the first set of data is a text data set; and the means for automatically modifying data from the second set of data further comprises means for including in the modified second set of data all data from the second set of data that is between data corresponding to adjacent text data in the modified text data set.

51. A system as in claim 16, wherein:

the first set of data is a text data set; and the second set of data is a video data set.

52. A system as in claim 16, further comprising means for displaying the modified second set of data.

53. A computer readable storage medium as in claim 17, wherein:

the first set of data is an audio data set; and the second set of data is a video data set.

54. A computer readable storage medium as in claim 17, wherein:

the first set of data is a text data set; and the second set of data is an audio data set.

55. A computer readable storage medium as in claim 54, further comprising instructions for producing the text data set from the audio data set.

56. A computer readable storage medium as in claim 17, wherein a third set of data is temporally related to both the first and second sets of data, the computer readable storage medium further comprising:

instructions for aligning the third set of data with either the first or second sets of data to establish a temporal correspondence between the third set of data and the first or second sets of data; and instructions for automatically modifying data from the third set of data that is aligned with data from the modified first or second set of data to produce a modified third set of data.

57. A computer readable storage medium as in claim 56, wherein:

the first set of data is a text data set;

the second set of data is an audio data set; and the third set of data is a video data set.

58. A computer readable storage medium as in claim 57, wherein:

the instructions for aligning the first set of data with the second set of data further comprise instructions for aligning the text data set with the audio data set; and the instructions for aligning the third set of data with either the first or second sets of data further comprise instructions for aligning the video data set with the audio data set.

59. A computer readable storage medium as in claim 58, wherein:

the instructions for modifying the first set of data further comprise instructions for summarizing the text data set in the predetermined manner, thereby producing a text summary;

the instructions for automatically modifying data from the second set of data further comprise instructions for selecting audio data that is aligned with the text summary, thereby producing an audio summary; and the instructions for automatically modifying data from the third set of data further comprise instructions for selecting video data that is aligned with the audio summary, thereby producing a video summary.

60. A computer readable storage medium as in claim 17, wherein the instructions for modifying the first set of data further comprise instructions for summarizing the first set of data in the predetermined manner to produce a summarized first set of data, the instructions for automatically modifying the second set of data thereby producing a summarized second set of data.

61. A computer readable storage medium as in claim 60, wherein:

the first set of data is a text data set; and
the second set of data is an audio data set.

62. A computer readable storage medium as in claim 17, wherein the instructions for modifying the first set of data further comprise instructions for editing the first set of data in the predetermined manner to produce an edited first set of data, the instructions for automatically modifying the second set of data thereby producing an edited second set of data.

63. A computer readable storage medium as in claim 17, wherein:

each of the first and second sets of data include a plurality of segments, the segments of the first set of data being temporally related to the segments of the second set of data, each segment representing a particular news story;

the instructions for modifying the first set of data in a predetermined manner to produce a modified first set of data further comprise instructions for modifying the news stories represented by the first set of data in a predetermined manner, wherein the instructions for modifying the news stories represented by the first set of data further comprise instructions for summarizing one or more of the news stories represented by the first set of data; and the instructions for automatically modifying data from the second set of data further comprise instructions for modifying the news stories represented by the second set of data in accordance with the modification of the news stories as represented by the first set of data, wherein the instructions for modifying news stories represented by the second set of data further comprise instructions for summarizing news stories represented by the second set of data in accordance with the summarization of the news stories as represented by the first set of data.

64. A computer readable storage medium as in claim 17, wherein:

one of the first and second sets of data is a video data set including a plurality of frames of video data;

each of the first and second sets of data include a plurality of segments, the segments of the first set of data being temporally related to the segments of the second set of data;

the instructions for modifying the first set of data in a predetermined manner to produce a modified first set of data further comprise instructions for modifying the segments of the first set of data in a predetermined manner;

the instructions for automatically modifying data from the second set of data further comprise instructions for modifying segments of the second set of data in accordance with the modification of the corresponding segments of the first set of data; and the computer readable storage medium further comprises instructions for adding the first and/or last video frame of one or more of the segments of the modified video data set one or more times to the beginning and/or end, respectively, of the segment.

65. A computer readable storage medium as in claim 17, wherein:

the first set of data is a text data set;
the second set of data is an audio data set;
each of the first and second sets of data include a plurality of segments, the segments of the first set of data being temporally related to the segments of the second set of data;

the instructions for modifying the first set of data in a predetermined manner to produce a modified first set of data further comprise instructions for modifying the segments of the first set of data in a predetermined manner;

the instructions for automatically modifying data from the second set of data further comprise instructions for modifying segments of the second set of data in accordance with the modification of the corresponding segments of the first set of data; and the computer readable storage medium further comprises instructions for defining one or more segments of the audio data set so that the beginning of the audio segment is temporally prior to, or temporally coincident with, the beginning of the corresponding segment of the text data set, and so that the end of the audio segment is temporally subsequent to, or temporally coincident with, the end of the corresponding segment of the text data set.

66. A computer readable storage medium as in claim 17, wherein:

the first set of data is a text data set;
the second set of data is an audio data set; and
the computer readable storage medium further comprises instructions for defining the audio data set so that the beginning of the audio data set is temporally prior to, or temporally coincident with, the beginning of the text data set, and so that the end of the audio data set is temporally subsequent to, or temporally coincident with, the end of the text data set.

67. A computer readable storage medium as in claim 17, wherein the instructions for aligning further comprise:

instructions for dividing the first set of data into a plurality of parts;

instructions for dividing the second set of data into a plurality of parts such that each part of the second set of data approximately temporally corresponds to a part of the first set of data; and instructions for aligning corresponding parts of the first and second sets of data.

68. A computer readable storage medium as in claim 17, wherein the instructions for modifying the first set of data execute at least in part at the same time as the instructions for aligning the first set of data with the second set of data.

69. A computer readable storage medium as in claim 17, further comprising instructions for identifying, after execution of the instructions for modifying the first set of data and prior to execution of the instructions for aligning, parts of the second set of data that correspond approximately to parts of the first set of data that have been modified, wherein the instructions for aligning only align the modified parts of the first set of data and the corresponding identified parts of the second set of data.

70. A computer readable storage medium as in claim 17, wherein:

the first set of data is a text data set; and the instructions for automatically modifying data from the second set of data further comprise instructions for including in the modified second set of data all data from the second set of data except data which is aligned with data in the text data set that is not included in the modified text data set.

71. A computer readable storage medium as in claim 17, wherein:

the first set of data is a text data set; and the instructions for automatically modifying data from the second set of data further comprise instructions for including in the modified second set of data all data from the second set of data that is between data corresponding to adjacent text data in the modified text data set.

72. A computer readable storage medium as in claim 17, wherein:

the first set of data is a text data set; and the second set of data is a video data set.

73. A computer readable storage medium as in claim 17, further comprising instructions for displaying the modified second set of data.

* * * * *